US009400887B2

(12) United States Patent
Maeda

(10) Patent No.: US 9,400,887 B2
(45) Date of Patent: Jul. 26, 2016

(54) PROGRAM ANALYSIS/VERIFICATION SERVICE PROVISION SYSTEM, CONTROL METHOD FOR SAME, COMPUTER READABLE NON-TRANSITORY STORAGE MEDIUM, PROGRAM ANALYSIS/VERIFICATION DEVICE, PROGRAM ANALYSIS/VERIFICATION TOOL MANAGEMENT DEVICE

(71) Applicant: Japan Science and Technology Agency, Saitama (JP)

(72) Inventor: Toshiyuki Maeda, Hyogo (JP)

(73) Assignee: Japan Science and Technology Agency, Saitama (JP)

( * ) Notice: Subject to any disclaimer, the term of this patent is extended or adjusted under 35 U.S.C. 154(b) by 31 days.

(21) Appl. No.: 14/357,956

(22) PCT Filed: Nov. 12, 2012

(86) PCT No.: PCT/JP2012/079304
§ 371 (c)(1),
(2) Date: May 13, 2014

(87) PCT Pub. No.: WO2013/073504
PCT Pub. Date: May 23, 2013

(65) Prior Publication Data
US 2014/0304815 A1     Oct. 9, 2014

(30) Foreign Application Priority Data
Nov. 15, 2011   (JP) .................................. 2011-249978

(51) Int. Cl.
*G06F 11/00*      (2006.01)
*G06F 12/14*      (2006.01)
(Continued)

(52) U.S. Cl.
CPC ............ *G06F 21/57* (2013.01); *G06F 11/3604* (2013.01); *G06F 21/566* (2013.01)

(58) Field of Classification Search
CPC ............ H04L 63/1408; H04L 63/1416; H04L 63/1441; G06F 2221/033; G06F 2221/034
USPC .......................................................... 726/22
See application file for complete search history.

(56) References Cited

U.S. PATENT DOCUMENTS

2002/0162015 A1    10/2002   Tang
2005/0015760 A1     1/2005   Ivanov et al.
(Continued)

FOREIGN PATENT DOCUMENTS

| CN | 1314638 A | 9/2001 |
| JP | H09-288592 A | 11/1997 |

(Continued)

OTHER PUBLICATIONS

E. V. Kuzmin, Modeling, specification, and verification of automaton programs, Jan. 2008, Plenum Press Publisher, Programming and Computing Software, vol. 34, Issue 1, Full Text.*

(Continued)

*Primary Examiner* — Kambiz Zand
*Assistant Examiner* — Stephen Sanders
(74) *Attorney, Agent, or Firm* — Michael Best and Friedrich

(57) ABSTRACT

A program analysis/verification service provision system (1) includes: a tool registration/search section (313) for extracting, from a plurality of program analysis/verification tools (virtual machines) stored in a tool storage section (320), a virtual machine (T) in which a program analysis/verification tool for use in analysis/verification of a target program (P) has been installed and set; and a virtual machine execution environment section (120) for analyzing/verifying the target program (P) with use of the virtual machine (T) thus extracted.

20 Claims, 11 Drawing Sheets

(51) Int. Cl.
G06F 12/16 (2006.01)
G08B 23/00 (2006.01)
G06F 21/57 (2013.01)
G06F 11/36 (2006.01)
G06F 21/56 (2013.01)

(56) References Cited

U.S. PATENT DOCUMENTS

| 2006/0161982 | A1 | 7/2006 | Chari et al. | |
|---|---|---|---|---|
| 2006/0218563 | A1* | 9/2006 | Grinstein | G06F 8/20 719/328 |
| 2007/0016950 | A1 | 1/2007 | Okamura et al. | |
| 2007/0240216 | A1 | 10/2007 | O'Sullivan | |
| 2007/0261124 | A1 | 11/2007 | Centonze et al. | |
| 2008/0086477 | A1 | 4/2008 | Hawkins | |
| 2008/0250427 | A1* | 10/2008 | Shin | G06F 9/44589 719/318 |
| 2010/0058300 | A1* | 3/2010 | Zeng | G06F 11/3676 717/131 |

FOREIGN PATENT DOCUMENTS

| JP | 2002-108778 A | 4/2002 |
|---|---|---|
| JP | 2007-025812 A | 2/2007 |
| JP | 2010-198054 A | 9/2010 |
| JP | 2010-211456 A | 9/2010 |
| RU | 2358313 C2 | 6/2009 |
| TW | 200641607 | 12/2006 |
| WO | WO-03/010670 A1 | 2/2003 |

OTHER PUBLICATIONS

Nima Jafan Navimipour, A formal approach for the specification and verification of a Trustworthy Human Resource Discovery mechanism in the Expert Cloud, Sep. 2015, Expert Systems with Applications: An International Journal, vol. 42, Issue 15, Full Text.*
International Preliminary Report on Patentability issued in PCT/JP2012/079304, dated May 20, 2014.
Web page, "Free Online Virus Scanner," http://lhsp.s206.xrea.com/misc/onlinescan.en.html, 2 sheets, Nov. 2010.
Web page, "Probably the Best Free Security List in the World," htttp://www.techsupportalert.com/content/probably-best-free-security-list-world.htm?page=0,4, 6 pages, Apr. 2014.
Web page, "Probably the Best Free Security List in the World—p. 5," http://web.archive.org/web/20111006204755/http://www.techsupportalert/com/content/probably-best-free-security-list-world.htm?page=0.4, 6 pages, Oct. 2011.
Web page, "Past Events and Presentations—SWAMP" https://continuousassurance.org/aboutus/events/, Software Assurance Marketplace, 2013-2015.
Web page, "Department of Homeland Security—Science and Technology—CSD SWAMP" http://www.dhs.gov/science-andtechnology/csd-swamp, Department of Homeland Security, 2012-2013.
Web page, "TTA #14: Software Assurance MarketPlace (SWAMP) Cyber Security Division 2012 Principal Investigators' Meeting," http://www.dhs.gov/sites/default/files/publications/csd-day-3-02-tta14-swamplivny.pdf, Department of Homeland Security Science and Technology, Oct. 11, 2012.
Vaughn-Nichols, "Homeland Security gets into software security," ZDNet, http://www.zdnet.com/article/homelandsecurity-gets-into-software-security/, Jul. 24, 2014.
Web page, "SWAMP User Manual," https://continuousassurance.org/swamp/SWAMP-User-Manual.pdf; Software Assurance Marketplace, issued Oct. 16, 2014.
International Search Report issued in Application No. PCT/JP2012/079304, mailed Feb. 12, 2013.
Written Opinion of International Search Authority of JPC/JP2012/079304, maild Feb. 12, 2013.
Web page, "The virus-malware analysis site by sandbox", http://1hsp.s206.xrea.com/misc/virussandbox.html, 3 sheets, Jun. 2011.
VMWARE: "Workstation 5 Powerful Virtual Machine Software for the Technical Professional," VMWARE User's Manual, http://www.vmware.com/pdf/ws5_manual.pdf, pp. 1-466, XP002559996, retrieved Dec. 11, 2009.
Extended Search Report issued in European Application No. 12850062.6, dated Jul. 24, 2015.
Notice of Allowance issued in Taiwanese Application No. 101142173, dated Nov. 16, 2015.
Office Action issued in Chinese Application No. 201280055921.7, dated Dec. 16, 2015.

* cited by examiner

F I G. 7
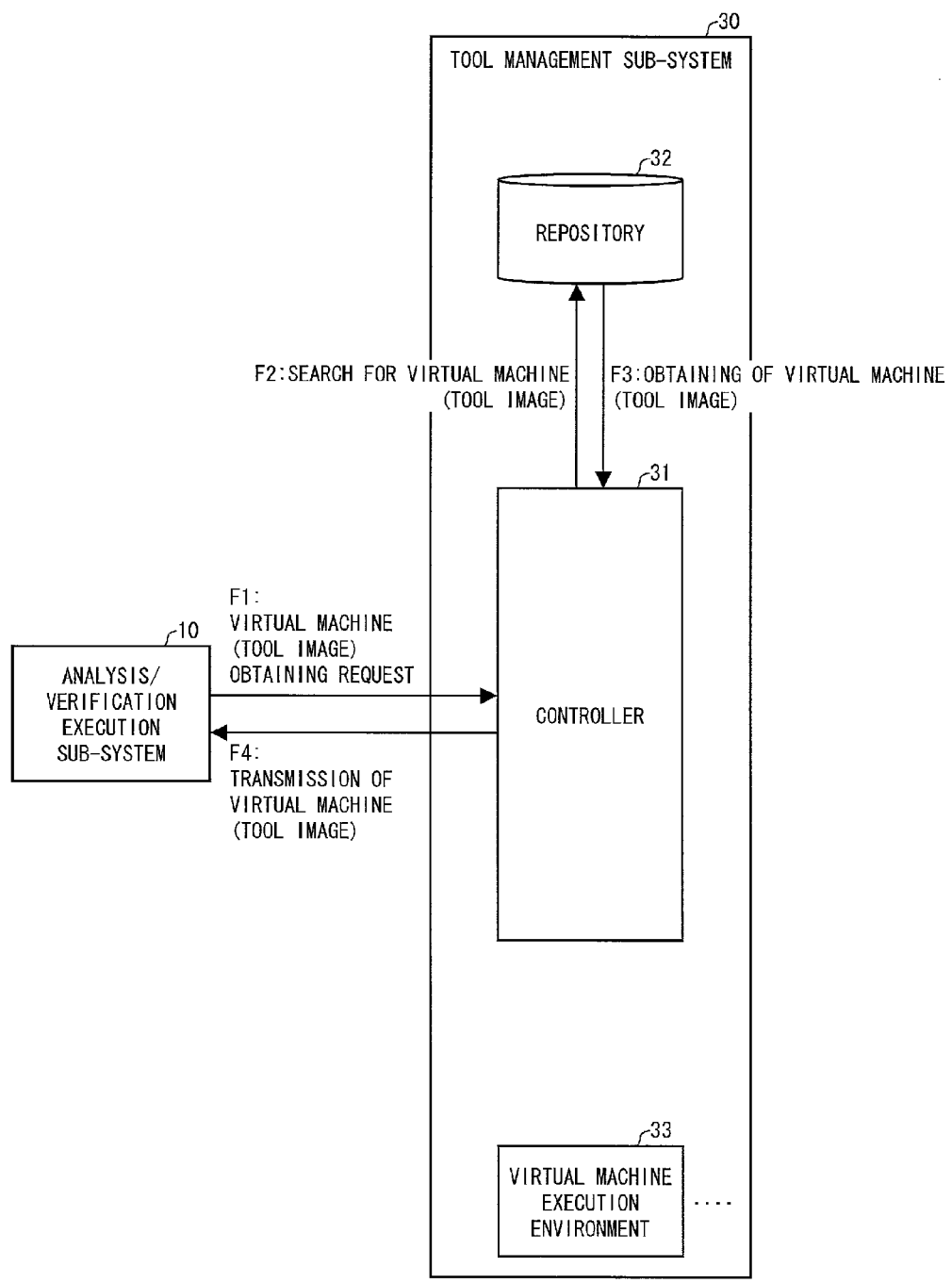

F I G. 8

REQUEST MANAGEMENT DATABASE DBi

| Information name | Definition | Examples |
|---|---|---|
| User identification information | Identification information on users | USER_A, USER_B, ... |
| User permission information | Access permission of users | GROUP_AB, PUBLIC, ADMIN, ... |
| Target program designation information | Information to designate a target program to be analyzed/verified (sum of target program identification information and target program related information) | OBJP_ID_1, C, SYSTEM_PROG, ... |
| Tool designation information | Information to designate a program analysis/verification tool to be used for analysis/verification (sum of tool identification information and tool related information) | TOOL_ID_0, C, USER_PROG, SYSTEM_PROG, CPU_SPEED_2G, MEM_MAX_1G, ... |
| Result data identification information | Identification information on result data of analysis/verification | RESULT_0, RESULT_1, ... |

FIG. 9

TARGET PROGRAM MANAGEMENT DATABASE DBp

| Information name | Definition | Examples |
|---|---|---|
| User identification information | Identification information on users | USER_A, USER_B, ... |
| User permission information | Access permission of users | GROUP_AB, PUBLIC, ADMIN, ... |
| Target program related information | User can arbitrarily determine the contents and the number. For example, the kind of programming language, the kind of program (distinction between a user program and a system program), etc. for use in the target program. | (Kind of programming language) Java, C, C++, OCaml, ... (Kind of program) USER_PROG, SYSTEM_PROG, LIBRARY, ... |
| Transmission method designation information | Designation of how to transmit the target program. For example, the target program is transmitted directly by a user, or is imported from an external system. | DIRECT_UPLOAD, IMPORT_git://XXX ... |
| Target program identification information | Identification information on target program to be analyzed/verified | OBJP_ID_0, OBJP_ID_1, ... |

FIG. 10

TOOL MANAGEMENT DATABASE DBt

| Information name | Definition | Examples |
| --- | --- | --- |
| Tool provider identification information | Identification information on tool providers | USER_A, USER_B, ... |
| Tool related information | Tool providers can arbitrarily determine the contents and the number. For example, the kind of programming language, the kind of program (distinction between a user program and a system program) with which a program analysis/verification tool can dealt, and an execution environment in which the program analysis/verification tool operates (the kind and the version of operating system, the kind and the version of library, and a necessary computational resource (the clock and the kind of CPU, sizes of a memory and a disk, etc.)). | (Kind of programming language)<br>Java, C, C++, OCaml, ...<br>(Kind of program)<br>USER_PROG, SYSTEM_PROG, LIBRARY, ...<br>(Examples of execution environment and computational resource)<br>OS_Linux_3.X,<br>LIB_libgplk_1.X,<br>CPU_KIND_X86,<br>CPU_SPEED_2G,<br>CPU_NUM_8,<br>MEM_MAX_1G,<br>DISK_MAX_4G, ... |
| Tool identification information | Identification information on virtual machine including tool image in which a program analysis/verification tool to be used for analysis/verification has been installed and set | TOOL_ID_0, TOOL_ID_1, ... |

PROGRAM ANALYSIS/VERIFICATION SERVICE PROVISION SYSTEM, CONTROL METHOD FOR SAME, COMPUTER READABLE NON-TRANSITORY STORAGE MEDIUM, PROGRAM ANALYSIS/VERIFICATION DEVICE, PROGRAM ANALYSIS/VERIFICATION TOOL MANAGEMENT DEVICE

TECHNICAL FIELD

The present invention relates to a program analysis/verification service provision system etc. for analyzing and verifying a target program with use of a program analysis/verification tool.

BACKGROUND ART

Program analysis/verification is a technique of analyzing and verifying that a program of a computer satisfies a certain characteristic. It is considered that the program analysis/verification is extremely effective means to certify and verify safety and reliability of the program.

In recent years, such a program analysis/verification technique has been tremendously improved, so that more and more practical programs can be analyzed and verified. Actually, various programs (hereinafter, referred to as "program analysis/verification tools") for carrying out the program analysis/verification have been developed for research use and for commercial use.

Here, a conventional art for sharing the program analysis/verification tool will be described by using a virus analysis/verification site as an example.

FIG. 11 is a view illustrating a typical configuration example of the virus analysis/verification site. As illustrated in FIG. 11, a user of a virus analysis/verification site 900 sends, to the virus analysis/verification site 900, a target program that the user wants to subject to virus analysis/verification (P1). For example, to sites listed in the following Non-patent Literature 1, the target program is sent via a Web interface. When the target program is sent to a site, the virus analysis/verification site 900 uses a virus analysis/verification software 901 to carry out analysis/verification the target program thus sent (P2). When the analysis/verification is completed, the virus analysis/verification site 900 sends a result of the analysis/verification to the user (P3).

An advantage of the virus analysis/verification site 900 is that a user of the site does not take time and effort to prepare a computational resource (CPU time, memory capacity, etc.) for the analysis/verification and to introduce analysis/verification software.

CITATION LIST

Non-Patent Literature

Non-Patent Literature 1: "Virus/malware analysis site by sandbox", [online], June, 2011, [search date: Oct. 20, 2011], the Internet <URL: http://lhsp.s206.xrea.com/misc/virussandbox.html>

SUMMARY OF INVENTION

Technical Problems

However, conventional program analysis/verification tools have the following practical problems.

(1) Enlargement of Computational Resource Required by Program Analysis/Verification Tool Depending on the type of program analysis/verification techniques, program analysis/verification tools need an extremely large amount of computational resources (CPU time, memory capacity, etc.). This phenomenon is particularly remarkable in a case where a complicated characteristic is analyzed and verified or in a case where a target program to be analyzed and verified is large. Therefore, the kind of and the size of analysis/verification that individual users of program analysis/verification tools can realistically carry out are limited.

(2) Diversification of the Kind of Program Analysis/Verification Tools

In accordance with improvement of analysis/verification techniques, extremely various kinds of program analysis/verification tools exist and new tools are being devised and developed. Therefore, it is difficult for users of program analysis/verification tools to determine which program analysis/verification tool to select.

(3) Time, Effort, and Cost of Introduction/Operation of Program Analysis/Verification Tool As described above, various kinds of program analysis/verification tools exist, however, a single program analysis/verification tool rarely satisfies a user's purpose of a program analysis/verification tool. Therefore, the user is required to introduce, operate, maintain, and manage a plurality of program analysis/verification tools. This increases time, effort, and cost.

(4) Difficulty of Testing Program Analysis/Verification Tools Themselves

Usability of program analysis/verification tools is being perceived widely. However, it is difficult to test the program analysis/verification tools themselves as to whether or not the program analysis/verification tools operate as were expected. This is because, as well as users of program analysis/verification tools, the size of analysis/verification of programs that providers of program analysis/verification tools can perform is limited and programs and source codes thereof that the providers of the program analysis/verification tools can use and view are limited, so that a test of a program analysis/verification tool cannot be performed on various target programs.

The present invention has been made in view of the above problems, and an object of the present invention is to achieve a program analysis/verification service provision system which can select one to be used from a plurality of program analysis/verification tools as appropriate and easily analyze/verify a program.

Solution to Problem

In order to achieve the above object, a program analysis/verification service provision system in accordance with the present invention, which program analysis/verification service provision system is for analyzing/verifying a target program with use of one or more program analysis/verification tools, includes: target program obtaining means for obtaining the target program; a tool storage section in which a plurality of program analysis/verification tools are stored; tool extraction means for extracting, from the plurality of program analysis/verification tools stored in the tool storage section, the one or more program analysis/verification tools for use in analysis/verification of the target program that the target program obtaining means has obtained; tool obtaining means for obtaining, from the tool storage section, the one or more program analysis/verification tools that the tool extraction means has extracted; and tool execution means for analyzing/verifying, with use of each of the one or more program analysis/verification tools that the tool obtaining means has obtained, the target program that the target program obtaining means has obtained.

Further, a method of controlling a program analysis/verification service provision system in accordance with the present invention, which method is for analyzing/verifying a target program with use of one or more program analysis/verification tools, the program analysis/verification service provision system including a tool storage section in which a plurality of program analysis/verification tools are stored, the method includes the steps of: target program obtaining step for obtaining the target program, tool extraction step for extracting, from the plurality of program analysis/verification tools stored in the tool storage section, the one or more program analysis/verification tools for use in analysis/verification of the target program that the target program obtaining step has obtained; tool obtaining step for obtaining the one or more program analysis/verification tools that has extracted from the tool storage section in the tool extraction step; and tool execution step for analyzing/verifying, with use of the one or more program analysis/verification tools that has obtained in the tool obtaining step, the target program that has obtained in the target program obtaining step.

Further, a data processing service provision system in accordance with the present invention, which data processing service provision system is for processing target data at multiple stages by subsequently using a plurality of data process tools, includes: a tool storage section in which the plurality of data process tools are stored in a state in which the plurality of data process tools are associated with respective pieces of tool related information on the plurality of data process tools; a result data storage section in which result data that has been obtained by processing data with use of one or more data process tools for use in a previous stage is stored in a state in which the result data is associated with characteristics descriptive information on the result data; result data obtaining means for obtaining the result data from the result data storage section; tool designation information obtaining means for obtaining, as tool designation information to designate which data process tool is used for processing the result data that the result data obtaining means has obtained, the characteristics descriptive information associated with the result data from the result data storage section; tool extraction means for searching the pieces of tool related information on the basis of the tool designation information that the tool designation information obtaining means has obtained, and extracting the one or more data process tools associated with a corresponding piece of the tool related information from the plurality of data process tools stored in the tool storage section; tool obtaining means for obtaining, from the tool storage section, the one or more data process tools that the tool extraction means has extracted; and tool execution means for processing, with use of the one or more data process tools that the tool obtaining means has obtained, the result data that the result data obtaining means has obtained.

Advantageous Effects of Invention

According to one aspect of the present invention, it is possible to select one program analysis/verification tool to be used from a plurality of program analysis/verification tools as appropriate and easily analyze/verify a program. Further, by carrying out the program analysis/verification on a sharing system, it is possible to solve various practical problems occurring in conventional program analysis/verification techniques. Those effects are not limited to a process for analyzing/verifying programs.

BRIEF DESCRIPTION OF DRAWINGS

FIG. 7, illustrating one embodiment of the present invention, is a block diagram illustrating a configuration of a tool management sub-system included in a program analysis/verification service provision system and a flow of a request process of obtaining a virtual machine including an image of a program analysis/verification tool from a analysis/verification execution sub-system.

FIG. 8 is an explanatory view of data for use in the program analysis/verification service provision system illustrated in FIG. 1, which shows a data structure of a request management database.

FIG. 9 is an explanatory view of data for use in the program analysis/verification service provision system illustrated in FIG. 1, which shows a data structure of a target program management database.

FIG. 10 is an explanatory view of data for use in the program analysis/verification service provision system illustrated in FIG. 1, which shows a data structure of a tool management database.

DESCRIPTION OF EMBODIMENTS

Figure 1:
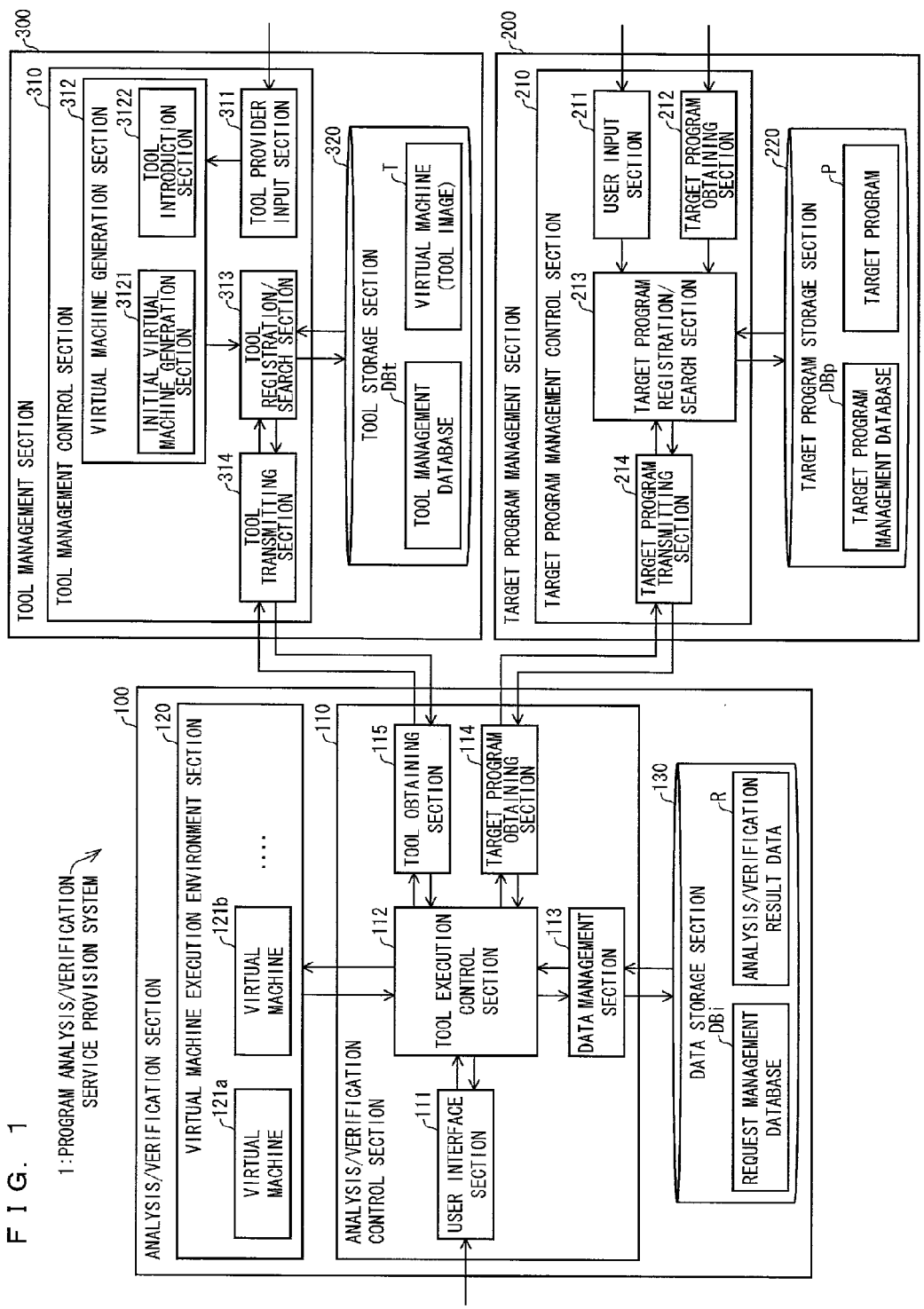
FIG. 1, illustrating one embodiment of the present invention, is a function block diagram illustrating a detailed configuration of a program analysis/verification service provision system.

The following description will discuss an embodiment of the present invention in detail. A program analysis/verification service provision system 1 of this embodiment will be discussed with reference to FIG. 1 to FIG. 10 as follows.

(1. Method of Configuring System for Sharing Program Analysis/Verification Tool)

First, the description will discuss a method of solving the four practical problems of the conventional program analysis/verification tools described above. Note that specific examples of the method will be described later.

A key concept is that, on the basis of a so-called "cloud" like approach which has been popular in recent years, users of a plurality of program analysis/verification tools and providers (tool providers) of a plurality of program analysis/verification tools share a single system and carry out program analysis/verification.

Specifically, the program analysis/verification service provision system 1 includes three sub-systems, i.e., an analysis/verification execution sub-system 10, a target program management sub-system 20, and a tool management sub-system 30. Individual sub-systems will be described below. Note that all the three sub-systems may be provided in a single computer, or may be divided into a plurality of computer groups which are connected via a network.

(1.1. Analysis/Verification Execution Sub-System)

First, based on a user's request, the analysis/verification execution sub-system 10 (FIG. 2, FIG. 3) obtains, from the target program management sub-system 20, a target program P to be subjected to the program analysis/verification, and obtains an analysis/verification tool (virtual machine T) from the tool management sub-system 30. Next, the program analysis/verification is carried out with use of the target program P and the analysis/verification tool (virtual machine T) thus obtained, and a result of the program analysis/verification (analysis/verification result data R) is registered in a repository 13. Further, the result thereof is shown to the user.

Regardless of the user's request, the analysis/verification execution sub-system 10 independently obtains, from the target program management sub-system 20, the target program P to be subjected to the program analysis/verification in accordance with an operation status thereof. Specifically, the operation status when the analysis/verification execution sub-system 10 obtains the target program P is, for example, a case where (1) a CPU utilization rate of the system, (2) a memory utilization rate, (3) an external storage utilization rate, or the like falls below a preset threshold. The analysis/verification execution sub-system 10 obtains not only the target program P but also the program analysis/verification tool (virtual machine T) from the tool management sub-system 30, and carries out analysis/verification, and then registers a result of the analysis/verification (analysis/verification result data R) in the repository 13. Therefore, in a case where a request is received from a user thereafter, it is possible to immediately return the result of the analysis/verification by inquiring the repository 13.

As described above, the plurality of users share the analysis/verification execution sub-system 10, which makes it possible to flexibly use a surplus computational resource. This can reduce a cost of the program analysis/verification as a whole. Further, because the program analysis/verification can be carried out in advance regardless of the user's request, it is possible to hide a cost of a computational resource which is needed for a whole process from receiving the user's request to providing the result of the analysis/verification. Furthermore, it is easy to select an appropriate program analysis/verification tool from a plurality of program analysis/verification tools.

(1.2. Target Program Management Sub-System)

Based on the user's request, the target program management sub-system 20 (FIG. 4, FIG. 5) maintains and manages (obtains/stores/renews/deletes) a target program P designated/provided by a user. Further, the target program management sub-system 20 provides an appropriate target program P in response to a request from the analysis/verification execution sub-system 10.

In this way, the program analysis/verification tool can be executed with respect to a target program P registered by a plurality of users, so that individual providers of program analysis/verification tools can carry out a test of the program analysis/verification tool with respect to various target programs P.

(1.3. Tool Management Sub-System)

Based on the user's request/command, the tool management sub-system 30 (FIG. 6, FIG. 7) maintains and manages (installs and sets/deletes) a program analysis/verification tool designated by a user (provider of the program analysis/verification tool). Further, the tool management sub-system 30 provides an appropriate program analysis/verification tool in response to an obtaining request from the analysis/verification execution sub-system 10.

As described above, the provider of the program analysis/verification tool installs, maintains, and manages the program analysis/verification tool, and a plurality of user share the program analysis/verification tool. Therefore, users do not need to install, maintain, and manage the program analysis/verification tool by themselves.

(2. Installation Example of System for Sharing Program Analysis/Verification Tool)

The following description will discuss one installation example of the sub-systems described above.

(2.1. One Installation Example of Analysis/Verification Execution Sub-System)

Figure 2:
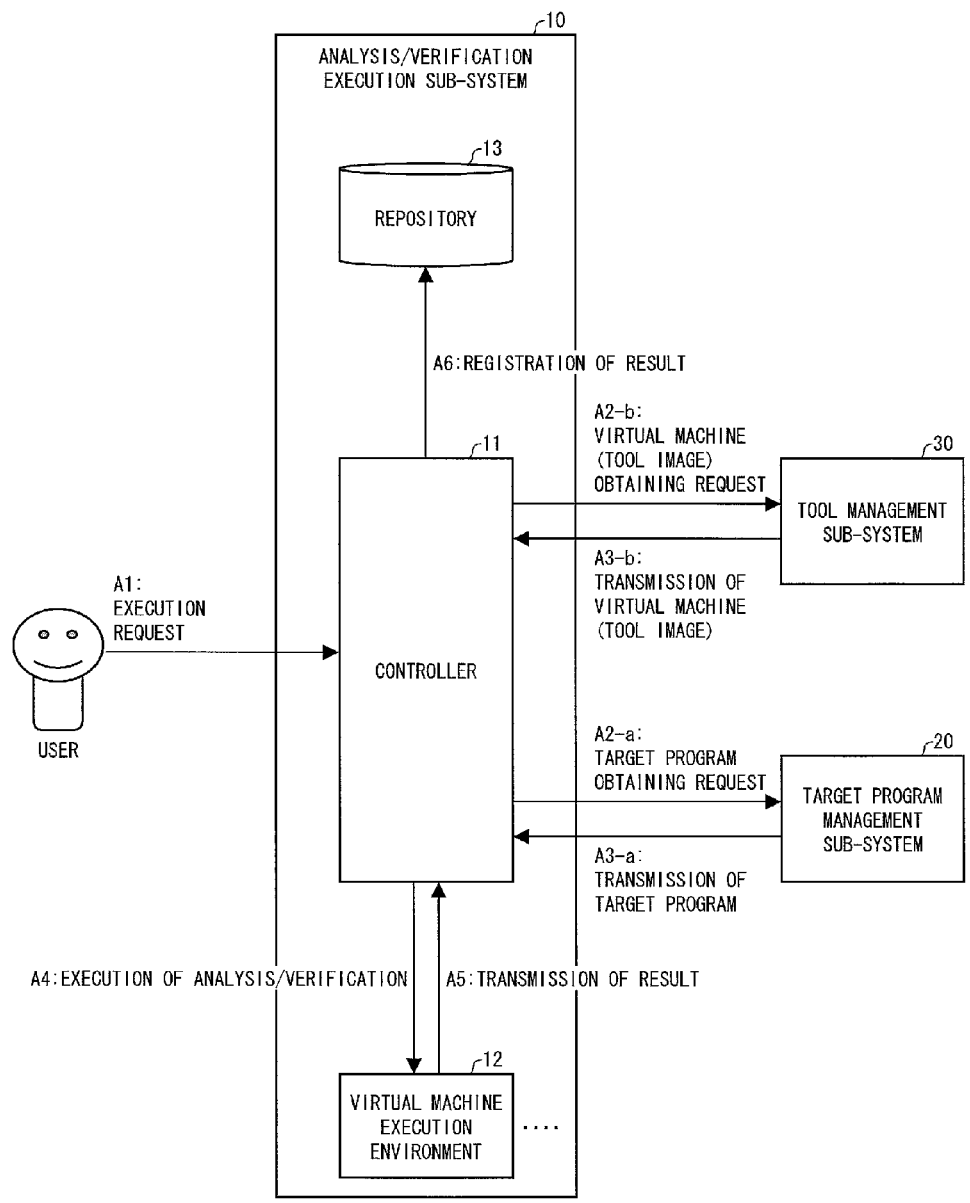
FIG. 2, illustrating one embodiment of the present invention, is a block diagram illustrating a configuration of an analysis/verification execution sub-system included in a program analysis/verification service provision system and a flow of an analysis/verification execution process.

FIG. 2 is a block diagram illustrating a configuration of the analysis/verification execution sub-system 10 and a flow of an analysis/verification execution process.

The analysis/verification execution sub-system 10 includes a controller 11, a virtual machine execution environment 12, and the repository 13. The controller 11 carries out processing of an execution request transmitted by a user, reception/transmission of data from/to the target program management sub-system 20 and from/to the tool management sub-system 30, execution of analysis/verification, and storage of a result of the analysis/verification in the repository 13. The virtual machine execution environment 12 is an execution environment for carrying out the analysis/verification. The repository 13 stores the result of the analysis/verification.

Note that there are two reasons why the analysis/verification is carried out with use of the virtual machine execution environment 12. As a first reason, by carrying out the analysis/verification with use of the virtual machine, a plurality of users and a plurality of providers of program analysis/verification tools can easily achieve fair use of the system. Here, the wording "fair use of the system" means that, for example, a program analysis/verification tool that consumes a CPU and a memory largely is executed later, and other program analysis/verification tools are preferentially executed.

As a second reason, by installing and setting the program analysis/verification tool on the virtual machine (see (2.3. One installation example of tool management sub-system) in detail), providers of program analysis/verification tools can install and set the program analysis/verification tools in an execution environment that is substantially the same as an execution environment in which they ordinarily develop and test the program analysis/verification tools. This can prevent providers of program analysis/verification tools from taking on an unnecessary burden such as correction of a program analysis/verification tool in order to cause the program analysis/verification tool to be suitable for a special execution environment and additional preparation of a system for causing a program analysis/verification tool to receive/transmit data from/to the outside.

A specific flow of execution of the analysis/verification is as follows. First, an execution request of the analysis/verification is transmitted to the controller 11 from a user (A1). The execution request includes a tag indicating which target program P is subjected to the analysis/verification and a tag indicating which program analysis/verification tool (virtual machine T) is used. The controller 11 that has received the execution request obtains the target program P from the target program management sub-system 20 on the basis of a tag designated by the execution request and a tag that is attached to the user in conformity with the user's permission (A2-a, A3-a; target program obtaining step), and obtains the virtual machine T including an image of the program analysis/verification tool from the tool management sub-system 30 (A2-b, A3-b; tool obtaining step).

Note that the "tag that is attached to the user in conformity with the user's permission" means a tag, which is attached to individual users, representing access permission to the program analysis/verification tool (virtual machine T) and to the target program P. For example, as a most basic tag, a tag such as "USER_A" is attached to an execution request that a user A transmits. This allows the user A to obtain a target program P and a program analysis/verification tool (virtual machines T) to which the tag "USER_A" is attached. Meanwhile, for a user B, a tag such as "USER_B" is attached, so that the user B cannot obtain a target program P and a program analysis/verification tool (virtual machine T) to which only the tag "USER_A" is attached. That is, the target program P and the program analysis/verification tool (virtual machine T) of the user A can be hidden from the user B. As a more complex example, in a case where the user A and the user B share their target programs P and program analysis/verification tools (virtual machines T) as common users, a tag such as "GROUP_AB" is attached to execution requests transmitted by the users A and B. Therefore, the users A and B can obtain the target programs P and the program analysis/verification tools (virtual machines T) to which the tag "GROUP_AB" is attached.

Then, with use of the target program P and a tool image (virtual machine T), the analysis/verification is actually executed in the virtual machine execution environment 12 (A4; tool execution step). After the analysis/verification, the controller 11 receives a result thereof (A5), and causes the repository 13 to store the result while associating the result with a tag (A6). Note that, as described above, the processes (A2) to (A6) of FIG. 2 may be carried out in advance in accordance with an operation status of the analysis/verification execution sub-system 10 even if an execution request is not transmitted from a user, although it is not illustrated in FIG. 2 explicitly. In this case, as the tag that is associated with the result while the result of the analysis/verification is stored in the repository 13, a tag which has been attached to the target program P itself and the tool image (virtual machine T) itself of the program analysis/verification tool can be used.

Figure 3:
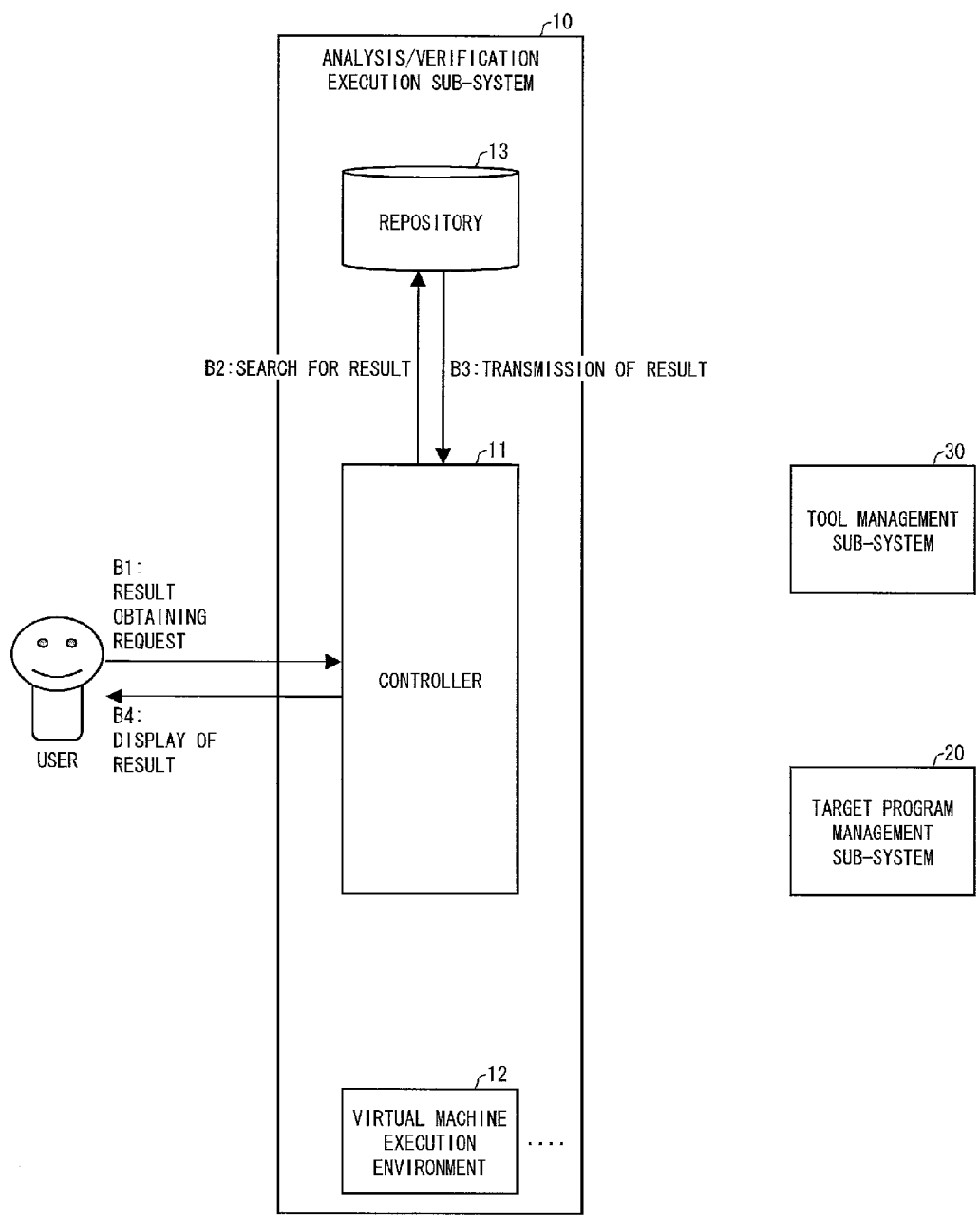
FIG. 3, illustrating one embodiment of the present invention, is a block diagram illustrating a configuration of an analysis/verification execution sub-system included in a program analysis/verification service provision system and a flow of a display process of a result of analysis/verification.

FIG. 3 is a block diagram illustrating a configuration of the analysis/verification execution sub-system 10 and a flow of a display process of the result of the analysis/verification.

The result of the analysis/verification stored in the repository 13 is presented to a user as described below. First, an obtaining request (result obtaining request) of the result of the analysis/verification is sent to the controller 11 by the user (B1). The result obtaining request includes tags same as those of the execution request described above. The controller 11 that has received the result obtaining request obtains the result of the analysis/verification from the repository 13 on the basis of a tag designated by the result obtaining request and a tag attached in accordance with the user's permission (B2, B3). Then, the controller 11 causes the result thus obtained to be displayed for the user (B4). Note that, in a case where the result is not stored in the repository 13, the processes (A2) to (A6) of FIG. 2 can be executed.

(2.2. One Installation Example of Target Program Management Sub-System)

Figure 4:
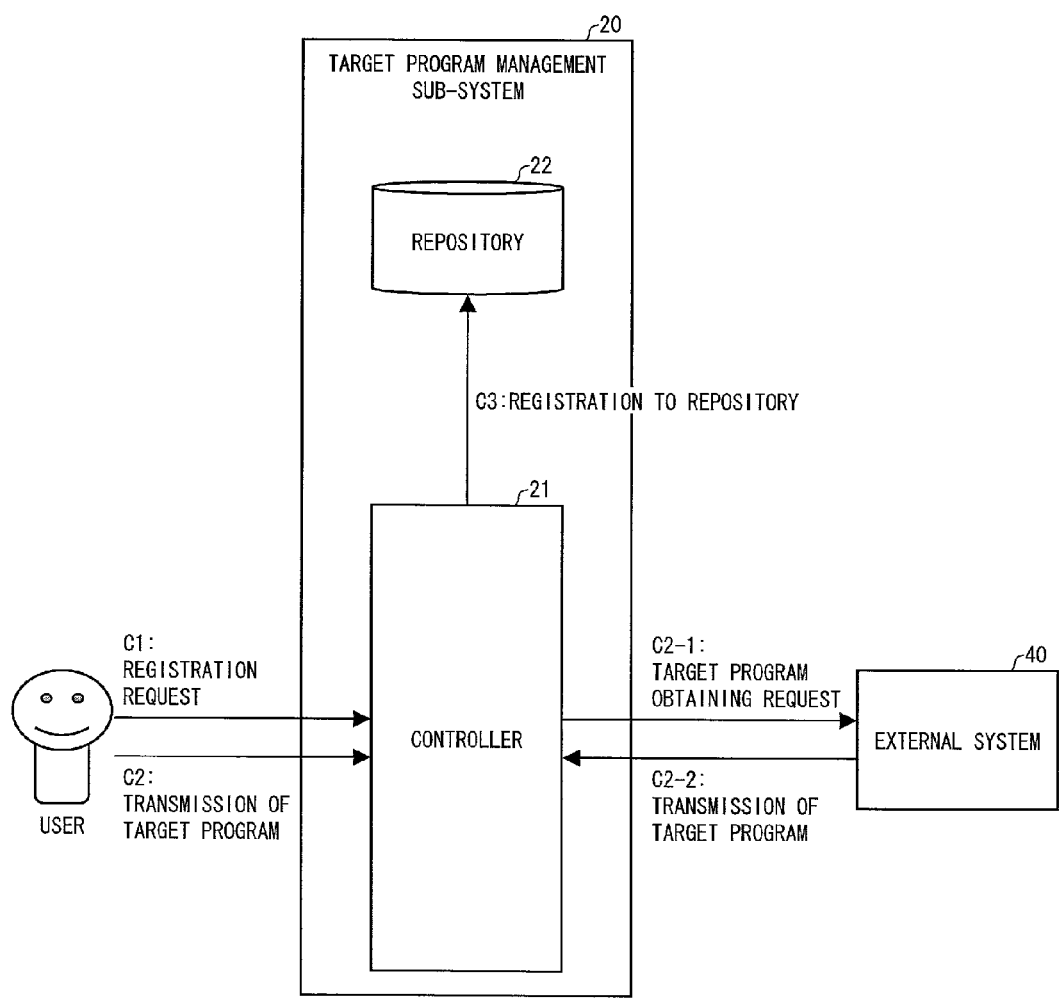
FIG. 4, illustrating one embodiment of the present invention, is a block diagram illustrating a configuration of a target program management sub-system included in a program analysis/verification service provision system and a flow of a registration process of a target program.

FIG. 4 is a block diagram illustrating a configuration of the target program management sub-system 20 and a flow of a registration process of the target program P.

The target program management sub-system 20 includes a controller 21 and a repository 22. The controller 21 carries out processing of a target program registration request transmitted by a user, obtaining of the target program P, and registration of the target program P to the repository 22. The repository 22 stores the target program P.

A flow of registration of a specific target program is as follows. First, a registration request of a target program P is transmitted to the controller 21 by the user (C1). The registration request includes a tag designated by the user and designation of how to transmit the target program P. The tag designated by the user in the registration request can be arbitrarily determined by the user in terms of the number and the contents thereof. It is expected that the tag is used when, for example, the kind of programming language for use in the target program P is designated and when the kind of program (distinction between a user program and a system program, etc.) is designated. Further, it is assumed that how to transmit the target program P is direct transmission from the user (C2) and import from an external system (version management system etc.) (C2-1, C2-2). The controller 21 that has received the registration request obtains the target program P in a way designated by the registration request (C2, C2-1, C2-2), associates the target program P with the tag designated by the registration request and the tag attached in accordance with the user's permission, and causes the repository 22 to store the target program P (C3).

Figure 5:
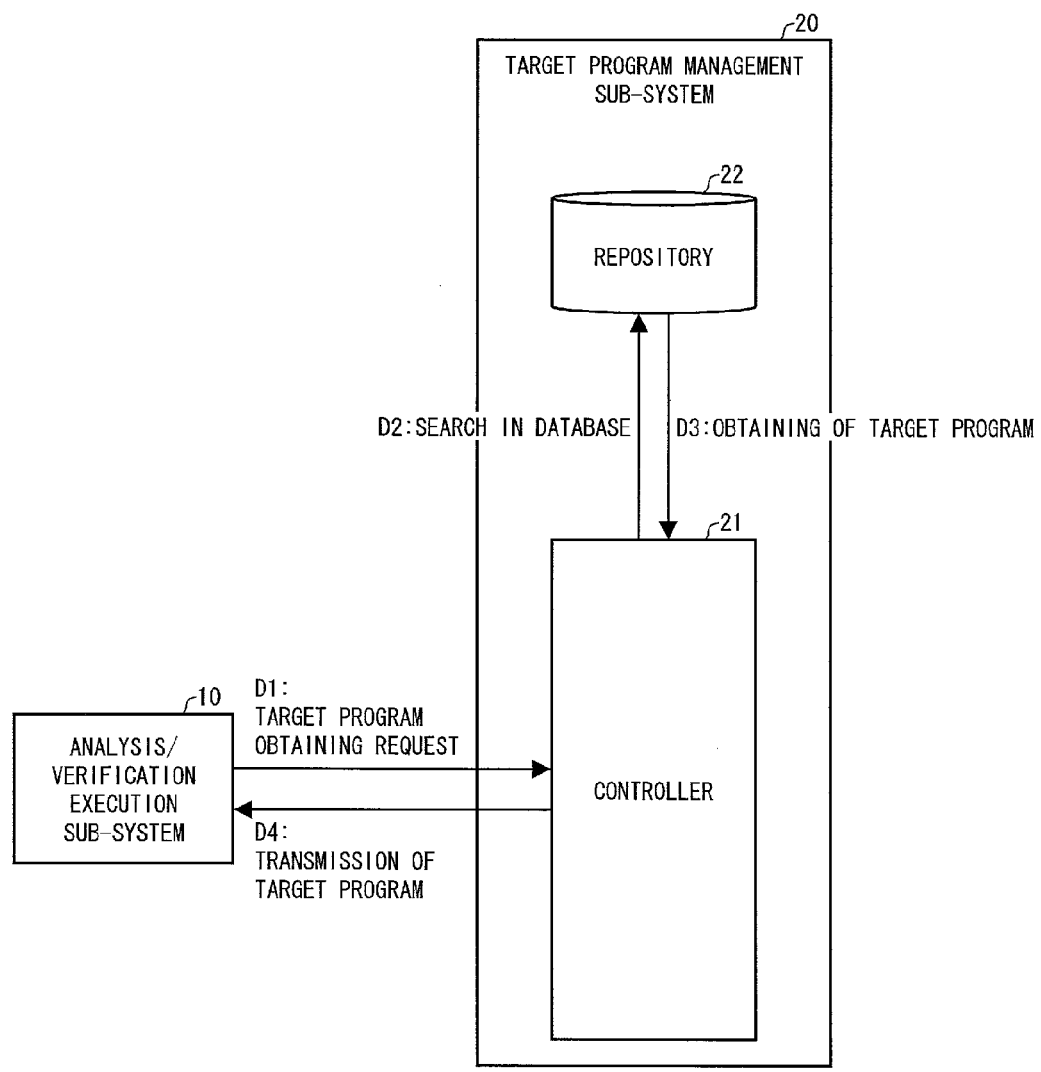
FIG. 5, illustrating one embodiment of the present invention, is a block diagram illustrating a configuration of a target program management sub-system included in a program analysis/verification service provision system and a flow of a request process of obtaining a target program from an analysis/verification execution sub-system.

FIG. 5 is a block diagram illustrating the configuration of the target program management sub-system 20 and a flow of a request process of obtaining the target program P from the analysis/verification execution sub-system 10.

When the controller 21 has received an obtaining request of the target program P from the analysis/verification execution sub-system 10 (D1), the controller 21 searches for the target program P in the repository 22 on the basis of a tag designated by the obtaining request (D2, D3). Then, the controller 21 transmits the target program P that has been obtained from the repository 22 to the analysis/verification execution sub-system (D4).

(2.3. One Installation Example of Tool Management Sub-System)

Figure 6:
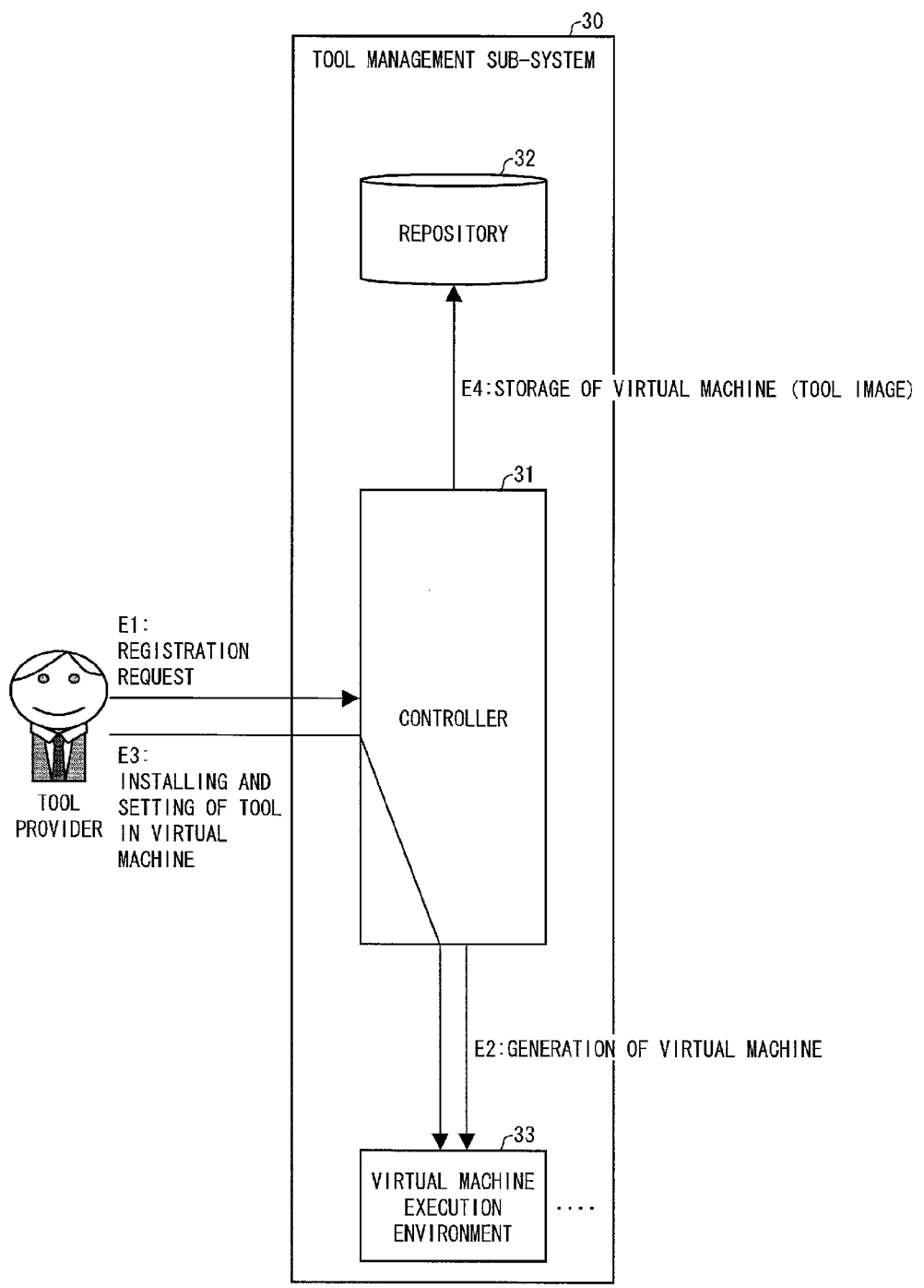
FIG. 6, illustrating one embodiment of the present invention, is a block diagram illustrating a configuration of a tool management sub-system included in a program analysis/verification service provision system and a flow of a registration process of a program analysis/verification tool.
Figure 11:
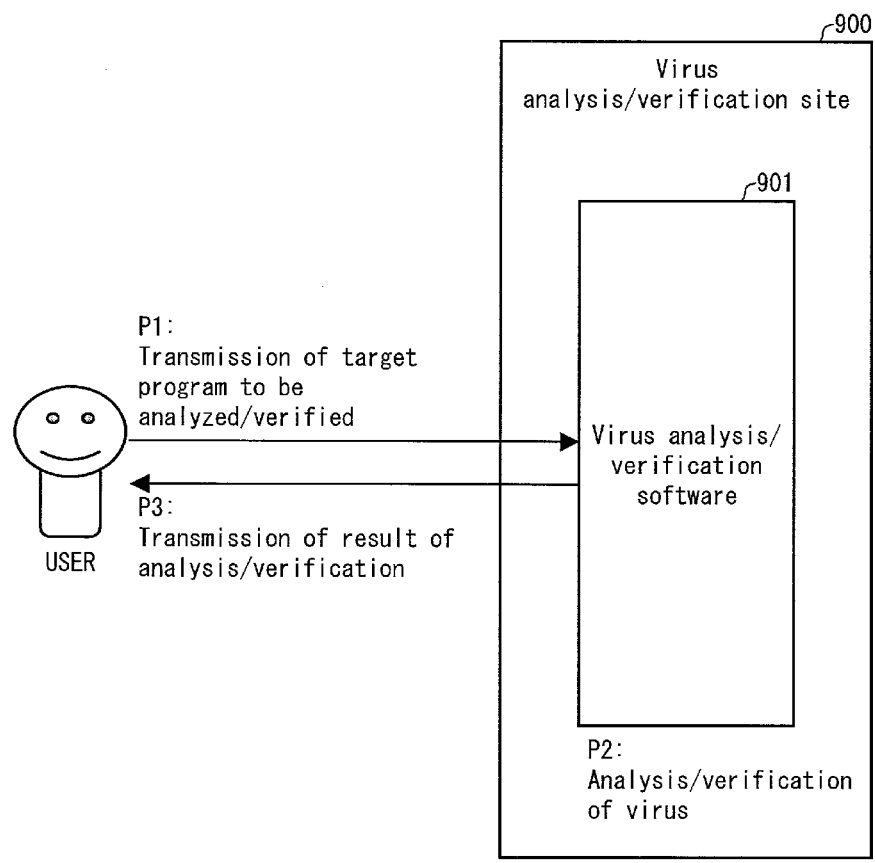
FIG. 11, illustrating a conventional technique, is a block diagram illustrating a typical configuration example of a virus analysis/verification site.

FIG. 6 is a block diagram illustrating a configuration of the tool management sub-system 30 and a flow of a registration process of the program analysis/verification tool.

The tool management sub-system 30 includes the controller 31, the repository 32, and the virtual machine execution environment 33. The controller 31 carries out processing of a registration request transmitted by a tool provider, generation of a virtual machine (initial virtual machine) for installing and setting the program analysis/verification tool, and storage of the virtual machine T including a tool image in the repository 32. The virtual machine execution environment 33 is an environment which allows the tool provider to install and set the program analysis/verification tool. The repository 32 stores a system image of the virtual machine T in which the program analysis/verification tool has been installed and set by the tool provider.

A specific flow of the registration process of the program analysis/verification tool is as follows. First, the registration request of the program analysis/verification tool is transmitted to the controller 31 from the tool provider (E1). The registration request includes a tag designated by the tool provider. The tag designated by the tool provider of the registration request can be arbitrarily determined by the tool provider in terms of the contents and the number thereof. The tag of the registration request designated by the tool provider is assumed to be used to designate the following: (1) the kind of programming language and the kind of program with which the program analysis/verification tool can deal (distinction between a user program and a system program, etc.); and (2) an execution environment in which the program analysis/verification tool operates (such as the kind and version of operating system, the kind and version of library, a necessary computational resource, i.e., the clock and kind of CPU, the size of a memory, and the size of a disk).

The controller 31 that has received the registration request generates a new virtual machine (initial virtual machine) (E2). At this time, the controller 31 forms an appropriate virtual machine (an appropriate virtual machine (initial virtual machine) in which the kind and version of operating system, the size of a memory, and the size of a disk are adjusted) in accordance with a tag designated by the registration request. Note that, in this embodiment, a virtual machine in which the program analysis/verification tool has not been installed and set yet is referred to as "initial virtual machine".

Here, in a case of frequent combinations of designated tags, an uncompleted virtual machine (initial virtual machine) in which an appropriate operating system or a library is installed in advance may be generated and stored in advance, and the uncompleted virtual machine may be simply copied when the virtual machine is needed. This makes it possible to reduce a cost for use in generation of the virtual machine.

Then, the tool provider executes, in the virtual machine execution environment 33, the virtual machine (initial virtual machine) generated via the controller 31, and the program analysis/verification tool is installed and set in the virtual machine (initial virtual machine) (E3). As described above, an appropriate operating system, an appropriate library, etc. are prepared in advance in a virtual machine (initial virtual machine) on the basis of a tag designated by a registration request. Therefore, the tool provider can install and set a program analysis/verification tool in the same way as the tool provider ordinarily installs and sets other program analysis/verification tools. This prevents tool providers from taking on an unnecessary burden such as correction of a program analysis/verification tool in order to cause the program analysis/verification tool to be suitable for the execution environment and preparation of a special system for causing the special system to receive/transmit data from/to an external system.

Finally, the controller 31 associates the virtual machine T with the tag designated by the registration request, and causes the repository 32 to store the virtual machine T including the tool image in which the program analysis/verification tool has been installed and set by the tool provider (E4).

FIG. 7 is a block diagram illustrating a configuration of the tool management sub-system 30 and a flow of a request process of obtaining the virtual machine T including an image of the program analysis/verification tool from the analysis/verification execution sub-system 10.

Upon receipt of a request of obtaining the virtual machine T from the analysis/verification execution sub-system 10 (F1; tool obtaining step), the controller 31 searches for the virtual machine T in the repository 32 on the basis of a tag designated by the obtaining request (F2, F3; tool extracting step), and transmits the virtual machine T thus obtained to the analysis/verification execution sub-system 10 (F4; tool obtaining step).

(3. Detailed Description of Example)

The following description will discuss one example of the program analysis/verification service provision system 1 in detail.

(3.1. Configuration)

The following description will discuss a configuration of the program analysis/verification service provision system 1 with reference to FIG. 1 and FIG. 8 to FIG. 10. FIG. 1 is a function block diagram illustrating the configuration of the program analysis/verification service provision system 1. FIG. 8 to FIG. 10 are explanatory views showing data for use in the program analysis/verification service provision system 1. Note that, in the following description, FIG. 2 to FIG. 7 are also referred to as appropriate.

The program analysis/verification service provision system 1 provides a service which allows a user of a program analysis/verification tool to analyze/verify a target program P with use of the program analysis/verification tool provided by a tool provider.

As illustrated in FIG. 1, the program analysis/verification service provision system 1 is configured to include an analysis/verification section (program analysis/verification device) 100, a target program management section (program analysis/verification target program management section) 200, and a tool management section (program analysis/verification tool management device) 300. Note that the program analysis/verification service provision system 1 may be configured by a single device. That is, the analysis/verification section 100, the target program management section 200, and the tool management section 300 may be mounted on a single device. Alternatively, the program analysis/verification service provision system 1 may be configured by a plurality of devices. Specifically, the analysis/verification section 100, the target program management section 200, and the tool management section 300 may be separately mounted on two or more devices.

Further, the analysis/verification section 100, the target program management section 200, and the tool management section 300 correspond to the analysis/verification execution sub-system 10, the target program management sub-system 20, and the tool management sub-system 30, respectively, illustrated in FIG. 2 to FIG. 7.

Note that this embodiment will discuss a case where information inputted from/outputted to the program analysis/verification service provision system 1 to/from the outside and information processed in the program analysis/verification service provision system 1 are written in the form of tag, however, the form is not limited to tags.

(3.1.1. Analysis/Verification Section)

First, the analysis/verification section 100 has a function of (i) receiving an execution request of analysis/verification of a target program P from a user, (ii) obtaining the target program P and a program analysis/verification tool (virtual machine T) in accordance with the execution request, (iii) executing the analysis/verification, and (iv) storing analysis/verification result data R (FIG. 2). The analysis/verification section 100 also has a function of receiving a result obtaining request from a user and presenting the analysis/verification result data R thus stored to the user (FIG. 3).

Therefore, as illustrated in FIG. 1, the analysis/verification section 100 includes an analysis/verification control section 110, a virtual machine execution environment section (tool execution means) 120, and a data storage section 130. Note that the analysis/verification control section 110, the virtual machine execution environment section 120, and the data storage section 130 correspond to the controller 11, the virtual machine execution environment 12, and the repository 13, respectively, of the analysis/verification execution sub-system 10 illustrated in FIG. 2 to FIG. 3.

The analysis/verification control section 110 controls the whole analysis/verification section 100. Specifically, the analysis/verification control section 110 includes a user interface section (tool designation information obtaining means) 111, a tool execution control section 112, a data management section 113, a target program obtaining section (target program obtaining means) 114, and a tool obtaining section (tool obtaining means) 115.

The user interface section 111 presents an operation screen to a user in order to provide a user interface for receiving input. The user interface section 111 may directly receive a user's operation such as a keyboard and a mouse, or may indirectly receive the user's operation via a communication network such as the Internet.

Specifically, upon receipt of the operation from the user, the user interface section 111 obtains a tag indicating identification information on the user (user identification information) and a tag indicating permission of the user (user permission information).

The user interface section 111 also receives the execution request from the user (A1 of FIG. 2). The execution request includes the tag indicating which target program P is subjected to analysis/verification (target program designation information) and the tag indicating which program analysis/verification tool (virtual machine T) is used (tool designation information). The tool designation information is to designate which program analysis/verification tool (virtual machine T) is used for the analysis/verification of the target program P that the target program obtaining section 114 has obtained.

The user interface section 111 receives the result obtaining request from the user (B1 of FIG. 3). The result obtaining request includes a tag similar to that of the execution request. Note that, in the result obtaining request, the tool designation information can be omitted.

The tool execution control section 112 analyzes/verifies the target program P on the basis of the execution request that the user interface section 111 has received from the user. Specifically, the tool execution control section 112 controls the target program obtaining section 114, and obtains the target program P on the basis of the target program designation information (A2-a, A3-a of FIG. 2; target program obtaining step). The tool execution control section 112 also controls the tool obtaining section 115, and obtains the virtual machine T including an image of the program analysis/verification tool on the basis of the tool designation information (A2-b, A3-b of FIG. 2; tool obtaining step). Further, the tool execution control section 112 causes the virtual machine execution environment section 120 to execute the target program P thus obtained on the virtual machine T thus obtained, to thereby analyze/verify the program (A4 of FIG. 2; tool execution step). Note that such analysis/verification of the target program P can be carried out on the virtual machine T while the target program P is being executed on the virtual machine T, however, the analysis/verification can be also carried out without execution of the target program P. Furthermore, the tool execution control section 112 receives a result of the analysis/verification after the analysis/verification in the virtual machine execution environment section 120 is completed (A5 of FIG. 2), and controls the data management section 113 to associate the result (analysis/verification result data R) with the tag of the execution request, and then causes the data storage section 130 to store the result (A6 of FIG. 2).

Note that the tool execution control section 112 can carry out the processes (A2) to (A6) of FIG. 2 in advance in accordance with an operation status (CPU utilization rate, memory utilization rate, external storage utilization rate, etc.) of the virtual machine execution environment section 120 etc., even if the execution request is not transmitted from the user. In this case, the tag that is associated with the result when the result (analysis/verification result data R) is stored in the data storage section 130 is a tag attached to the target program P itself and a tag attached to the virtual machine T itself.

The tool execution control section 112 controls the data management section 113 on the basis of the result obtaining request that the user interface section 111 has received from the user, obtains the analysis/verification result data R stored in the data storage section 130, and presents the result on the user interface section 111 to the user (B1 to B4 of FIG. 3). Specifically, the obtaining of the analysis/verification result data R is carried out by searching for a request management database DBi with use of the tag included in the result obtaining request and obtaining associated analysis/verification result data R (i.e., analysis/verification result data R associated with the tag) from the data storage section 130.

Upon receipt of the execution request from the user, the data management section 113 causes the request management database DBi of the data storage section 130 to store a content of the tag included in the execution request. Further, the data management section 113 causes the data storage section 130 to store the analysis/verification result data R. At this time, the analysis/verification result data R is stored in the request management database DBi so as to be associated with identification information (result data identification information) on the analysis/verification result data R and information on the tag of the execution request. Further, upon receipt of the result obtaining request from the user, the data management section 113 reads out, from the data storage section 130, the analysis/verification result data R corresponding to the content of the tag included in the result obtaining request.

The target program obtaining section 114 transmits a target program obtaining request having target program designation information to the target program management section 200 (A2-a of FIG. 2), and obtains the target program P in response thereto (A3-a of FIG. 2).

The tool obtaining section 115 transmits a virtual machine (tool image) obtaining request having tool designation information to the tool management section 300 (A2-b of FIG. 2), and obtains the program analysis/verification tool (virtual machine T) in response thereto (A3-b of FIG. 2).

The virtual machine execution environment section 120 analyzes/verifies, on the virtual machine T obtained by the tool obtaining section 115, the target program P by operating the target program P that the target program obtaining section 114 has obtained (A4 of FIG. 2).

The data storage section 130 stores the request management database DBi and the analysis/verification result data R. As shown in FIG. 8, the request management database DBi stores the user identification information, the user permission information, the target program designation information, the tool designation information, and the result data identification information in one record. The analysis/verification result data R is associated with other information by the result data identification information.

Here, information registered in the request management database DBi will be specifically discussed with reference to FIG. 8.

The user identification information is identification information on users. Examples "USER_A, USER_B" represent tags attached to a user A, a user B, respectively.

The user permission information is access permission of users. An example "GROUP_AB" represents a tag indicating group permission, by which the users A and B can share a target program P and a program analysis/verification tool (virtual machine T). A tag "PUBLIC" represents a tag indicating that an arbitrary user can access a tagged program and a tagged program analysis/verification tool (virtual machine T). A tag "ADMIN" represents a tag indicating that only a manager can access a tagged program and a tagged program analysis/verification tool (virtual machine T).

The target program designation information is information to designate which target program P is subjected to analysis/verification. The target program designation information corresponds to the sum of target program identification information and target program related information of a target program management database DBp. An example "OBJP_ID_1, C, SYSTEM_PROG" represents a target program "which has identification information OBJP_ID_1, which is a C language program, and whose kind is a system program".

The tool designation information is information to designate which program analysis/verification tool (virtual machine T) is used for the analysis/verification. The tool designation information corresponds to the sum of tool identification information and tool related information of a tool management database DBt. An example "TOOL_ID_0, C, USER_PROG, SYSTEM_PROG, CPU_SPEED_2G, MEM_MAX_1G" represents a program analysis/verification tool (virtual machine T) which "has identification information TOOL_ID_0, can verify a user program and a system program, includes a CPU having the frequency of 2 GHz, and uses a memory of 1G at a maximum".

The result data identification information is identification information on result data (analysis/verification result data R) of the analysis/verification. An example "RESULT_0, RESULT_1" represents identification information for referring to the result data of the analysis/verification.

Note that information (e.g., consecutive number and date and time of issue of request) to directly specify the execution request may be further provided in the request management database DBi. Note, however, that it is possible to specify the execution request in a case where the target program designation information and the tool designation information, i.e., the target program P and the program analysis/verification tool (virtual machine T), are uniquely designated in the request management database DBi. Therefore, the information is not essential.

(3.1.2. Target Program Management Section)

The target program management section 200 has a function of receiving a registration request of the target program P from the user, obtaining the target program P in accordance with the registration request, and storing the target program P (FIG. 4). The target program management section 200 also has a function of receiving a target program obtaining request from the analysis/verification section 100 and transmitting the target program P thus stored to the analysis/verification section 100 (FIG. 5).

Therefore, as illustrated in FIG. 1, the target program management section 200 includes a target program management control section 210 and a target program storage section 220. Note that the target program management control section 210 and the target program storage section 220 correspond to the controller 21 and the repository 22, respectively, of the target program management sub-system 20 illustrated in FIG. 4 to FIG. 5.

The target program management control section 210 controls the whole target program management section 200. Specifically the target program management control section 210 includes a user input section 211, a target program obtaining section 212, a target program registration/search section 213, and a target program transmitting section 214.

The user input section 211 presents an operation screen to a user in order to provide a user interface for receiving input. The user input section 211 may directly receive a user's operation such as a keyboard and a mouse, or may indirectly receive the user's operation via a communication network such as the Internet.

Specifically, upon receipt of an operation from the user, the user input section 211 obtains the tag indicating identification information on the user (user identification information) and the tag indicating permission of the user (user permission information).

Further, the user input section 211 receives the registration request of the target program P from the user (C1 of FIG. 4). The registration request includes the tag (target program related information) designated by the user, a tag designating how to transmit the target program P (transmission method designation information), identification information (target program identification information) on the target program P which is to be analyzed/verified.

The target program obtaining section 212 obtains the target program P on the basis of the registration request that the user input section 211 has received from the user. Specifically, in a case where the transmission method designation information included in the registration request is "direct transmission", the target program obtaining section 212 obtains the target program P transmitted by the user (C2 of FIG. 4). Meanwhile, in a case where the transmission method designation information included in the registration request is "import", the target program obtaining section 212 obtains the target program P from an external system (version management system or the like) (C2-1, C2-2 of FIG. 4).

In a case where the user input section 211 receives the registration request from the user, the target program registration/search section 213 causes the target program management database DBp of the target program storage section 220 to store the content of the tag included in the registration request (C3 of FIG. 4). The target program registration/search section 213 also causes the target program storage section 220 to store the target program P that the target program obtaining section 212 has obtained (C3 of FIG. 4). At this time, the target program P is stored in the target program management database DBp so as to be associated with the identification information on the target program P (target program identification information) and the information on the tag of the registration request.

Further, upon receipt of the target program obtaining request from the analysis/verification section 100, the target program registration/search section 213 refers to the target program management database DBp and reads out the corresponding target program P from the target program storage section 220 in response to the target program designation information (the sum of the target program identification information and the target program related information) included in the target program obtaining request (D1 to D4 of FIG. 5).

The target program transmitting section 214 receives the target program obtaining request having the target program identification information from the analysis/verification section 100 (D1 of FIG. 5), and, in response to the target program obtaining request, transmits the target program P to the analysis/verification section 100 (D4 of FIG. 5).

The target program storage section 220 stores the target program P in the target program management database DBp. As illustrated in FIG. 9, the target program management database DBp stores the user identification information, the user permission information, the target program related information, the transmission method designation information, and the target program identification information in one record. The target program P is associated with other information by the target program identification information.

Here, information registered in the target program management database DBp will be discussed specifically with reference to FIG. 9.

The user identification information is identification information on users. Examples "USER_A, USER_B" represent tags attached to a user A, a user B, respectively.

The user permission information is access permission of users. An example "GROUP_AB" represents a tag indicating group permission, by which the users A and B can share a target program P and a program analysis/verification tool (virtual machine T). A tag "PUBLIC" represents a tag indicating that an arbitrary user can access a tagged program and a tagged program analysis/verification tool (virtual machine T). A tag "ADMIN" represents a tag indicating that only a manager can access a tagged program and a tagged program analysis/verification tool (virtual machine T).

The target program related information is information that can be arbitrarily determined by a user in terms of the contents and the number thereof. For example, as the target program related information, the kind of programming language, the kind of program (distinction between a user program and a system program), etc. for use in the target program P can be written. In the examples, "the kind of programming language" and "the kind of program" are exemplified. The examples "Java, C, C++, OCaml", which are examples of the kind of programming language, exemplify tags indicating by which programming language the target program is written. Further, the examples "USER_PROG, SYSTEM_PROG, LIBRARY", which are examples of the kind of program, exemplify the kind of target program (user program, system program, library, etc.).

The transmission method designation information is information in which how to transmit the target program P is designated, e.g., whether the target program P is directly transmitted by the user or is imported from an external system, is written. An example "DIRECT_UPLOAD" represents a tag indicating that the target program P is directly uploaded by a user. An example "IMPORT_git://XX . . ." represents a tag indicating that the target program P is obtained or has been obtained from an external repository (herein, git://XXX . . . ).

The target program identification information indicates the identification information on the target program P which is to be analyzed/verified. Examples "OBJP_ID_0, OBJP_ID_1" represent tags indicating identification information for referring to the target program P stored therein.

(3.1.3. Tool Management Section)

The tool management section 300 has a function of receiving a registration request of a program analysis/verification tool from a tool provider, generating a virtual machine T in which the program analysis/verification tool is installed and set in response to the registration request, and storing the virtual machine T (FIG. 6). The tool management section 300 also has a function of receiving a virtual machine obtaining request from the analysis/verification section 100 and transmitting, to the analysis/verification section 100, the virtual machine T which has been searched for on the basis of the tool designation information thus obtained and then has been extracted (FIG. 7).

Therefore, as illustrated in FIG. 1, the tool management section 300 includes a tool management control section 310 and a tool storage section 320. Note that the tool management control section 310 and the tool storage section 320 correspond to the controller 31 and the repository 32, respectively, of the tool management sub-system 30 shown in FIG. 6 to FIG. 7. In the tool management section 300 of FIG. 1, a virtual machine generation section 312 of the tool management control section 310 has a function corresponding to the function that the virtual machine execution environment 33 of the tool management sub-system 30 has.

The tool management control section 310 controls the whole tool management section 300. Specifically, the tool management control section 310 includes a tool provider input section 311, a virtual machine generation section (virtual machine generation means) 312, a tool registration/search section (tool extraction means) 313, and a tool transmitting section 314.

The tool provider input section 311 presents an operation screen to the user in order to provide a user interface for receiving an input. The tool provider input section 311 may directly receive a user's operation via input devices such as keyboard and a mouse, or may indirectly receive the user's operation via a communication network such as the Internet.

Specifically, upon receipt of an operation from a tool provider, the tool provider input section 311 obtains a tag (tool provider identification information) of identification information on the tool provider.

The tool provider input section 311 also receives the registration request of the program analysis/verification tool from the tool provider (E1 of FIG. 6). The registration request includes a tag designated by the tool provider (tool related information) and a tag of identification information on the program analysis/verification tool (tool identification information). Note that the tool identification information is used as identification information on the virtual machine T including a tool image in which the program analysis/verification tool for use in the analysis/verification has been installed and set. Furthermore, the tool provider input section 311 receives the program analysis/verification tool in response to the registration request (E3 of FIG. 6).

The virtual machine generation section 312 generates, for each program analysis/verification tool, a virtual machine T in which the program analysis/verification tool has been installed and set (E2 of FIG. 6). For generation of the virtual machine T, the tool related information that the registration request has is used as data for installing and setting the program analysis/verification tool in the virtual machine. The virtual machine generation section 312 includes an initial virtual machine generation section 3121 and a tool introduction section 3122.

The initial virtual machine generation section 3121 generates, on the basis of the tool related information, a virtual machine (initial virtual machine) in which the program analysis/verification tool has not been installed and set yet. Therefore, for example, it is possible to obtain an initial virtual machine which is appropriate in terms of the kind of programming language and the kind of program (distinction between a user program and a system program) with which the program analysis/verification tool deals and an execution environment (the kind and version of operating system, the kind and version of library, a necessary computational resource, i.e., a clock and the kind of CPU, sizes of a memory and a disk, etc.) in which the program analysis/verification tool operates.

The tool introduction section 3122 executes the virtual machine (initial virtual machine) that the initial virtual machine generation section 3121 has generated, and installs and sets the program analysis/verification tool on the basis of an instruction etc. by the tool provider (E3 of FIG. 6).

In a case where the tool provider input section 311 receives the registration request from the tool provider, the tool registration/search section 313 causes the tool management database DBt of the tool storage section 320 to store the content of the tag included in the registration request (E4 of FIG. 6). The tool registration/search section 313 also causes the tool storage section 320 to store the virtual machine T that the virtual machine generation section 312 has generated (C3 of FIG. 4). At this time, the tool registration/search section 313 causes the tool storage section 320 to store the virtual machine T as data of a tool image.

Further, the tool registration/search section 313 causes the tool management database DBt to store the virtual machine T so that the virtual machine T is associated with the identification information (tool identification information) etc. thereof. Upon receipt of a virtual machine (tool image) obtaining request from the analysis/verification section 100, the tool registration/search section 313 refers to the tool management database DBt and searches for the tool related information corresponding to the tool designation information that the virtual machine (tool image) obtaining request has. Then, the tool registration/search section 313 reads out, from the tool storage section 320, the virtual machine (tool image) T associated with the tool related information corresponding to the tool designation information (F1 to F4 of FIG. 7).

The tool transmitting section 314 receives the virtual machine (tool image) obtaining request having tool designation information from the analysis/verification section 100 (F1 of FIG. 7), and, in response to the virtual machine (tool image) obtaining request, transmits one or more virtual machines T extracted by the tool registration/search section 313 to the analysis/verification section 100 (F4 of FIG. 7).

The tool storage section 320 stores the tool management database DBt and the virtual machine (image data) T. As illustrated in FIG. 10, the tool management database DBt stores the tool provider identification information, the tool related information, and the tool identification information in one record. The virtual machine (image data) T is associated with other information by the tool identification information.

Here, the information registered in the tool management database DBt will be discussed specifically with reference to FIG. 10.

The tool provider identification information is identification information on tool providers. Examples "USER_A, USER_B" represent tags attached to a user A, a user B, respectively.

The tool related information is information that can be arbitrarily determined by a user in terms of content and the number. The tool related information is, for example, the kind of programming language and the kind of program (distinction between a user program and a system program) with which the program analysis/verification tool (virtual machine T) can deal and an execution environment (the kind and version of operating system, the kind and version of library), a necessary computational resource (a clock and the kind of CPU, sizes of a memory and a disk, etc.) in which the program analysis/verification tool (virtual machine T) operates. In the examples, "the kind of programming language", "the kind of program", and the examples "execution environment and computational resource" are exemplified. The examples "Java, C, C++, OCaml", which are examples of the kind of programming language, exemplify tags indicating which program written in which programming language is a target of the program analysis/verification tool (virtual machine T). Further, the examples "USER_PROG, SYSTEM_PROG, LIBRARY", which are examples of the kind of program, exemplify the kind of program (user program, system program, library, etc.) that the program analysis/verification tool (virtual machine T) can analyze/verify. Further, the examples "OS_Linux 3.X, LIB_libgplk_1.X, CPU_KIND_X86, CPU_SPEED_2G, CPU_NUM_8, MEM_MAX_1G, DISK_MAX_4G", which are examples of the execution environment and computational resource, exemplify the kind of the execution environment and the kind of computational resource where and with use of which the program analysis/verification tool (virtual machine T) can execute. In this case, the examples indicate that the OS is Linux 3.X, the library is libgplk 1.X, the kind of CPU is X86, an execution frequency is 2 GHz, the number of cores of the CPU is 8 or less, an amount of a maximum usage memory is 1 GB, and an amount of the disk is 4 G.

The tool identification information is identification information on the virtual machine T including the tool image in which the program analysis/verification tool (virtual machine T) for use in the analysis/verification has been installed and set. Examples "TOOL_ID_0, TOOL_ID_1" represent stored program analysis/verification tools, and, more specifically, represent identification information for referring to the virtual machine T including the tool image in which the program analysis/ verification tool has been installed and set.

(4. Comparison with Conventional Techniques)

Here, regarding the problems described as "Technical Problems", the description will discuss differences between the program analysis/verification service provision system 1 of this embodiment and conventional techniques, in particular, a virus analysis/verification site (Non-patent Literature 1).

(1) Enlargement of Computational Resource Required by Program Analysis/Verification Tool Regarding this problem, in a case of conventional virus analysis/verification sites, users do not need to prepare a computational resource, however, providers of analysis/verification tools need to prepare a computational resource by themselves or to form new web interfaces.

On the contrary, in a case of the program analysis/verification service provision system 1, tool providers of a plurality of program analysis/verification tools can share a computational resource, so that a burden on the tool providers is largely reduced. Further, as described above in (2.3. One installation example of tool management sub-system), the tool provider merely needs to install and set a program analysis/verification tool in a virtual machine which has been prepared in advance. Therefore, the tool providers do not need to perform additional works such as formation of new web interfaces.

(2) Diversification of the Kind of Program Analysis/Verification Tools

Regarding this problem, a large number of virus analysis/verification sites exist as described in Non-patent Literature 1, however, those sites are operated by different tool providers individually, and a uniform interface does not exist. Therefore, it is difficult for users of program analysis/verification tools to determine which program analysis/verification tool to select, i.e., which virus analysis/verification site to select.

(3) Time, Effort, and Cost of Introduction/Operation of Program Analysis/Verification Tool Regarding this problem, similarly, a large number of virus analysis/verification sites are operated by different tool providers individually, and a uniform interface does not exist. Therefore, it is difficult to carry out analysis/verification effectively with use of a plurality of sites and to collect/compare results of the analysis/verification.

As easy means for avoiding the problem, it is conceivable that a plurality of program analysis/verification sites are used as back ends and a site to provide a uniform interface as a front end. The means is specifically carried out as follows: a target program is received from a user; the target program is transmitted to a plurality of program analysis/verification sites; and results thereof are collected and then transmitted to the user.

However, as described below, this method still has problems. First, if a target program is simply transmitted to a plurality of program analysis/verification sites, the target program is also transmitted to sites which do not provide the program analysis/verification tool that the user needs. As a result, efficiency of the analysis/verification is decreased and results of analysis/verification becomes enormous, and therefore comparison and examination of the results are difficult. On the contrary, as described in (2. Installation example of a system for sharing program analysis/verification tool), the program analysis/verification service provision system 1 is configured so that target programs and program analysis/verification tools are managed by tagging the target programs and the program analysis/verification tools. It is therefore possible to select a necessary program analysis/verification tool efficiently.

Further, as another problem, if a target program is simply transmitted to a plurality of program analysis/verification site, users need to store and manage results of the analysis/verification. Therefore, there is a possibility that the users are burdened with a computational resource or the users unnecessarily repeat identical analysis/verification. On the contrary, in the program analysis/verification service provision system 1, as described in (2. Installation example of a system for sharing program analysis/verification tool), results of analysis/verification can be uniformly stored in a repository, and therefore searching etc. of the results can be performed by using tagging.

Furthermore, the means of using a plurality of sites as a back end cannot solve the problems (1) and (4).

(4) Difficulty of Testing Program Analysis/Verification Tools Themselves

Regarding this problem, first, computational resources that providers of individual analysis/verification tools can prepare are limited, and a size and a complexity of a target to be actually analyzed/verified is limited. Therefore, the difficulty of testing program analysis/verification tools themselves is a problem that conventional virus analysis/verification sites also have.

On the contrary, in the program analysis/verification service provision system 1, providers of a plurality of program analysis/verification tools share computational resources. As a result, it is possible to analyze/verify a target having a larger size and a more complicated configuration, and therefore it is possible to test the program analysis/verification tools themselves more strictly. Further, because a program to be analyzed/verified can be shared by a plurality of program analysis/verification tools, and therefore it is possible to perform a test of each program analysis/verification tool on more targets.

As described above, conventional virus analysis/verification sites have advantages, for example, users do not need to prepare a computational resource for analysis/verification and to perform an additional work such as introduction of analysis/verification software. However, the conventional virus analysis/verification sites still have the problems ((1) to (4)) that the present invention has achieved.

(5. Application to Multiple Stages of Analysis/Verification)

The above description has discussed a case where the program analysis/verification service provision system 1 analyzes/verifies a target program with use of the program analysis/verification tool at a single stage. However, the program analysis/verification service provision system 1 can be suitably used in a case where the target program is analyzed/verified at multiple stages of analysis/verification.

Further, for example, in a case where a target program is analyzed/verified with use of a program analysis/verification tool and then result data obtained by the analysis/verification is further analyzed/verified, tool designation information for use in the analysis/verification at each stage and tool related information are preferably tagged appropriately with the target program or the result data. Specifically, the program analysis/verification service provision system 1 is configured such that a tag is used at the each stage of analysis/verification etc., and therefore it is also possible to efficiently carry out analysis/verification in a case where a target program is analyzed/verified at a multiple-stage process of analysis/verification.

The following description will discuss an example where a target program is analyzed/verified at multiple stages with use of a tag at each stage in the program analysis/verification service provision system 1.

Here, the description will discuss (i) a process in which the program analysis/verification service provision system 1 analyzes/verifies a target program with use of a program analysis/verification tool and (ii) a case where result data obtained by the process is subsequently subjected to analysis/verification (postprocessing).

First, the result data, which the virtual machine execution environment section (tool execution means) 120 has obtained by analyzing/verifying the target program with use of the program analysis/verification tool, is associated with characteristics descriptive information (tag) of the result data, and then is stored in the data storage section (result data storage section) 130. Meanwhile, the tool storage section 320 stores the result data in a state in which the program analysis/verification tool (postprocessing tool) for analyzing/verifying the result data is associated with the analysis/verification tool related information.

Then, the user interface section (tool designation information obtaining means) 111 obtains, as the tool designation information, the characteristics descriptive information associated with the result data from the data storage section 130.

The tool registration/search section (tool extraction means) 313 searches for the tool related information on the basis of the tool designation information that the user interface section 111 has obtained, and extracts, from a plurality of postprocessing tools that the tool storage section 320 stores, a postprocessing tool associated with the tool related information thus found.

Thereafter, the program analysis/verification service provision system 1 subsequently carries out analysis/verification (postprocessing) with respect to the result data of analyzing/verifying the target program with use of the postprocessing tool thus extracted as described above.

In the above example, it is conceivable that examples of the characteristics descriptive information (tag) which is preferably attached to the result data of this analysis/verification process encompass tags indicating the kind of data (e.g., "execution_path" (representing an execution path), "execution_trace" (representing execution trace), "program_point" (representing an execution point in a program)). Further, the tool designation information (tag) can be also attached to a data analysis tool in the same way as the program analysis/verification.

Note that the number of process stages of analyzing/verifying the target program is not limited to two stages, and the number of process stages may be arbitrarily used.

The above description has described a case where the program analysis/verification service provision system 1 analyzed/verified the target program with use of the program analysis/verification tool and subsequently analyzed/verified the result data thereof. However, the present invention can be also applied to a case where the program analysis/verification service provision system 1 analyzes/verifies a result of data analyzed/verified in another system. That is, in a process of analysis/verification at multiple stages, all processing of the analysis/verification may be carried out by the program analysis/verification service provision system 1, or processing at each stage may be carried out by another system.

Specifically, the program analysis/verification service provision system 1 can carry out analysis/verification more accurately on the basis of an execution path that another system has outputted as a result of analysis.

Also in a case where a program analysis/verification tool of another system, which is not the program analysis/verification tool of the program analysis/verification service provision system 1, analyzes/verifies the target program, it is possible to analyze/verify the result data with use of a data analysis tool by attaching a tag (attaching characteristics descriptive information) to the result data which has been outputted as a result of the analysis/verification.

That is, even in a case where the program analysis/verification tool of the another system analyzes/verifies the target program, it is possible to use a frame of the present invention by attaching a tag to the result data of the analysis/verification to be outputted and storing the result data.

Further, as described above, the present invention is not restrictively applied to analysis/verification of a target program and to a process (postprocessing) of analyzing/verifying result data of the analysis/verification to be outputted. For example, it is preferably possible to apply tagging also in a case where preprocessing is necessary to analyze/verify a target program.

The following description will discuss an example where a target program which has been obtained by preprocessing a pre-preprocessed program is analyzed/verified with use of the program analysis/verification service provision system 1 in order to analyze/verify the target program.

Depending on the kind of program analysis/verification tool, it is assumed that a target program (post-preprocessed program) needs to be prepared as a result of preprocessing of a program (pre-preprocessed program).

Specifically, the target program, which is a result of preprocessing the pre-preprocessed program with use of a preprocessing tool (tool), is outputted as a first stage, and then the target program is stored in the target program storage section (post-preprocessed-program storage section) 220. Then, as a second stage, the target program obtained by the preprocessing is subsequently subjected to an analysis/verification process with use of the program analysis/verification tool.

In this case, the target program, obtained by preprocessing the program which has not been subjected to preprocessing, is stored in the target program storage section (post-preprocessed-program storage section) 220 so that the target program is associated with the characteristics descriptive information (tag) of the target program.

Then, the target program obtaining section 114 obtains the target program from the target program storage section 220. Meanwhile, the user interface section (tool designation information obtaining means) 111 obtains, as the tool designation information, the characteristics descriptive information associated with the target program, which characteristics descriptive information is obtained by the target program, from the target program storage section 220.

As a process which needs preprocessing of a program in order to analyze/verify a certain program as described above, there are, for example, data flow analysis, control flow analysis, program slicing, and pointer analysis.

Thereafter, the preprocessing tool (tool) and the target program (post-preprocessed program) are tagged and stored, which makes it possible to use the frame of the present invention.

Indeed, there are various kinds of preprocessing tools as well as the analysis/verification tools, and the various kinds of preprocessing tools consume a computational resource largely. Therefore, the present invention is effective not only to the analysis/verification tools but also to the preprocessing tools.

For example, it is conceivable that, as the tag (tool related information) which is attached to the preprocessing tool (tool), there are a tag indicating a target which can be subjected to preprocessing (which is similar to a tag attached to the verification tool) and a tag indicating which preprocessing is carried out (e.g., a tag indicating the kind of preprocessing such as "data_flow_analysis", "control_flow_analysis", "program_slicing", and "pointer_analysis"). It is also conceivable that, as the characteristics descriptive information (tag) which is associated with the data of the preprocessing result, "data_flow_analysis", "control_flow_analysis", "program_slicing", "pointer_analysis", etc. are effective.

The following description will discuss, as an example in which the above two examples are combined, a case where the target program is subjected to preprocessing with use of the preprocessing tool (preprocessing data process tool) in the program analysis/verification service provision system (data processing service provision system) 1, and then the target program which has been subjected to the preprocessing is analyzed/verified with use of the program analysis/verification tool, and then result data of the analysis/verification is analyzed/verified with use of another analysis/verification tool (postprocessing data process tool).

As a first stage, the target program, which is the result of preprocessing the pre-preprocessed program with use of the preprocessing tool (preprocessing data process tool), is outputted and the target program is stored in the target program storage section (post-preprocessed-program storage section) 220. The target program, which has been obtained by preprocessing the pre-preprocessed program, is associated with the characteristics descriptive information (tag) of the target program, and is stored in the target program storage section (post-preprocessed-program storage section) 220 as described above.

At this time, it is conceivable that the characteristics descriptive information (tag) preferably attachable to the target program which has been subjected to the preprocessing, is, for example, a tag indicating the kind of preprocessing ("data_flow_analysis", "control_flow_analysis", "program_slicing", "pointer_analysis", etc.), as described in the above examples.

Then, as a second stage, the target program, which has been obtained by the preprocessing, is analyzed/verified with use of the program analysis/verification tool. Specifically, first, the target program obtaining section 114 obtains the target program from the target program storage section 220. Meanwhile, the user interface section (tool designation information obtaining means) 111 obtains, as the tool designation information, characteristics descriptive information associated with the target program, which characteristics descriptive information has been obtained by the target program from the target program storage section 220. Then, the virtual machine execution environment section (tool execution means) 120 analyzes/verifies the target program with use of the program analysis/verification tool, and result data thus obtained is stored in the data storage section (result data storage section) 130 so as to be associated with the characteristics descriptive information (tag) of the result data.

At this time, it is conceivable that the characteristics descriptive information (tag) preferably attachable to the result data is, for example, a tag indicating the kind of data ("execution_path" (representing an execution path), "execution_trace" (representing an execution trace), and "program_point" (representing an execution point of the program), etc.), as described in the above examples.

Finally, as a third stage, the user interface section (tool designation information obtaining means) 111 obtains, as the tool designation information, the characteristics descriptive information associated with the result data from the data storage section 130. The tool storage section 320 stores the program analysis/verification tool (postprocessing data process tool) for analyzing/verifying the result data so that the program analysis/verification tool is associated with the analysis/verification tool related information. Then, the tool registration/search section (tool extraction means) 313 searches for the tool related information on the basis of the tool designation information that the user interface section 111 has obtained, and extracts, from a plurality of postprocessing tools that the tool storage section 320 stores, a postprocessing tool (postprocessing data process tool) associated with the tool related information thus found. Thereafter, the program analysis/verification service provision system 1 obtains the data process tool thus extracted from the tool storage section 320, and subsequently carries out, with use of the postprocessing tool thus obtained, analysis/verification (postprocessing) with respect to result data of the process in which the target program has been analyzed/verified.

Note that, in the above combination example, the number of preprocessing processes and the number of postprocessing processes are one each, however, it is possible to combine the arbitrary numbers of preprocessing processes, postprocessing processes, and analysis/verification processing processes. Further, any of the preprocessing, the postprocessing, and the analysis/verification processing can be omitted.

As described above, in a case where a data process is carried out at multiple stages, the program analysis/verification service provision system 1 associates the data (program or data other than the program) obtained at each stage as a result of the process with the characteristics descriptive information (tag), and then the data is stored. The data obtained at each stage as the result of the process is associated with the characteristics descriptive information (tag) at the same time as the data is stored or during a period after the data is stored but before a tool for use in the following processing at a next stage is extracted. In this case, the characteristics descriptive information (tag) to be associated is preferably determined in accordance with a predetermined rule which is suitable for the tool for use in processing at the each stage. Note that the program analysis/verification service provision system 1 may be configured so that a user manually associates the characteristics descriptive information (tag) with the data obtained from the processing at the each stage.

As described above, the present invention may be configured as follows in a case where the present invention is applied to analysis/verification at multiple stages at which a process (preprocessing) in which a target program is obtained by preprocessing a program and a process in which the target program thus obtained is analyzed/verified are subsequently carried out.

The program analysis/verification service provision system (program analysis/verification service provision system 1) for subsequently carrying out a first process in which a pre-preprocessed program is preprocessed to obtain the target program and a second process in which the target program thus obtained through the first process is analyzed/verified with use of the one or more program analysis/verification tools, the program analysis/verification service provision system further includes a post-preprocessed-program storage section (target program storage section 220) for storing the target program, which has been obtained by preprocessing the pre-preprocessed program, so that the target program is associated with characteristics descriptive information (tool designation information) on the target program, wherein: the target program obtaining means (target program obtaining section 114) obtains the target program from the post-preprocessed-program storage section; and the tool designation information obtaining means (the user interface section 111) obtains, as the tool designation information, from the post-preprocessed-program storage section, the characteristics descriptive information associated with the target program that the target program obtaining means has obtained.

Further, in the present invention, in a case where analysis/verification is carried out at multi stages, i.e., in a case where a first process in which the target program is analyzed/verified and a second process in which obtained result data is analyzed/verified are subsequently carried out, the present invention may be configured as follows.

The program analysis/verification service provision system (program analysis/verification service provision system 1) for subsequently carrying out a first process in which the target program is analyzed/verified with use of the one or more program analysis/verification tools and a second process in which result data obtained through the first process is postprocessed, the program analysis/verification service provision system further includes a result data storage section (data storage section 130) for storing the result data, which the tool execution means (virtual machine execution environment section 120) has obtained by analyzing/verifying the target program with use of the one or more program analysis/verification tools, in a state in which the result data is associated with characteristics descriptive information (tool designation information) on the result data, wherein: the tool storage section (tool storage section 320) stores at least one postprocessing tool for postprocessing the result data in a state in which the at least one postprocessing tool is associated with a piece of tool related information on the at least one postprocessing tool; the tool designation information obtaining means (the user interface section 111) obtains, as the tool designation information, from the result data storage section, the characteristics descriptive information associated with the result data; and the tool extraction means (tool registration/search section 313) searches for the piece of tool related information on the basis of the tool designation information that the tool designation information obtaining means has obtained, and extracts, from a plurality of postprocessing tools stored in the tool storage section, the at least one postprocessing tool associated with the piece of tool related information thus found.

Further, in a case where the present invention is configured as a service provision system which does not need an analysis/verification process of a program, the present invention can be also configured as follows.

A data processing service provision system (program analysis/verification service provision system 1) according to the present invention, which is for processing target data (target program, result data) at multiple stages by subsequently using a plurality of data process tools (program analysis/verification tool, preprocessing tool, postprocessing tool), the data processing service provision system includes: a tool storage section (tool storage section 320) in which the plurality of data process tools are stored in a state in which the plurality of data process tools are associated with respective pieces of tool related information on the plurality of data process tools; a result data storage section (data storage section 130) in which result data that has been obtained by processing data with use of one or more data process tools for use in a previous stage (program analysis/verification tool, preprocessing tool) is stored in a state in which the result data is associated with characteristics descriptive information (tool designation information) on the result data; result data obtaining means (target program obtaining section 114) for obtaining the result data from the result data storage section; tool designation information obtaining means (the user interface section 111) for obtaining, as tool designation information to designate which data process tool (program analysis/verification tool, postprocessing tool) is used for processing the result data that the result data obtaining means has obtained, the characteristics descriptive information associated with the result data from the result data storage section; tool extraction means (tool registration/search section 313) for searching the pieces of tool related information on the basis of the tool designation information that the tool designation information obtaining means has obtained, and extracting the one or more data process tools associated with a corresponding piece of the tool related information from the plurality of data process tools stored in the tool storage section; tool obtaining means (tool obtaining section 115) for obtaining, from the tool storage section, the one or more data process tools that the tool extraction means has extracted; and tool execution means (virtual machine execution environment section 120) for processing, with use of the one or more data process tools that the tool obtaining means has obtained, the result data that the result data obtaining means has obtained.

(6. Summary)

A program analysis/verification service provision system according to the present invention, which is for analyzing/verifying a target program with use of one or more program analysis/verification tools, includes: target program obtaining means for obtaining the target program; a tool storage section in which a plurality of program analysis/verification tools are stored; tool extraction means for extracting, from the plurality of program analysis/verification tools stored in the tool storage section, the one or more program analysis/verification tools for use in analysis/verification of the target program that the target program obtaining means has obtained; tool obtaining means for obtaining, from the tool storage section, the one or more program analysis/verification tools that the tool extraction means has extracted; and tool execution means for analyzing/verifying, with use of each of the one or more program analysis/verification tools that the tool obtaining means has obtained, the target program that the target program obtaining means has obtained.

Further, a method of controlling a program analysis/verification service provision system of the present invention, which method is for analyzing/verifying a target program with use of one or more program analysis/verification tools, the program analysis/verification service provision system including a tool storage section in which a plurality of program analysis/verification tools are stored, the method includes the steps of: target program obtaining step for obtaining the target program, tool extraction step for extracting, from the plurality of program analysis/verification tools stored in the tool storage section, the one or more program analysis/verification tools for use in analysis/verification of the target program that the target program obtaining step has obtained; tool obtaining step for obtaining the one or more program analysis/verification tools that has extracted from the tool storage section in the tool extraction step; and tool execution step for analyzing/verifying, with use of the one or more program analysis/verification tools that has obtained in the tool obtaining step, the target program that has obtained in the target program obtaining step.

According to the configuration, the target program is obtained, and the one or more program analysis/verification tools for use in the analysis/verification of the target program is extracted and obtained from the plurality of program analysis/verification tools stored in the tool storage section. Then, the target program is analyzed/verified with use of the one or more program analysis/verification tools thus obtained.

As described above, the target program can be obtained, and the one or more program analysis/verification tools for use in the analysis/verification can be selected in accordance with the target program from the plurality of program analysis/verification tools that have been prepared in advance. Therefore, it is possible to provide a plurality of users who want to analyze/verify target programs with a service in which analysis/verification is executed with use of program analysis/verification tools selected in accordance with the target programs from the plurality of program analysis/verification tools that have been prepared in advance. Further, for a plurality of tool providers who want to provide program analysis/verification tools, it is possible to provide a service in which requests of analysis/verification of target programs are received from a plurality of users and the target programs are analyzed/verified. That is, according to the configuration, it is possible to achieve a sharing system for use in the program analysis/verification tools.

With this, the present invention has the following effects. (1) Because a plurality of users can share a tool execution system, individual users do not need to prepare a computational resource. Therefore, it is possible to flexibly use a surplus computational resource, which reduces a cost of analysis/verification and increases the kind of analysis/verification and a size thereof which can be executed. (2) It is possible to collectively introduce, maintain, and manage program analysis/verification tools, so that individual users do not need to introduce, maintain, and manage the program analysis/verification tools. (3) Users can easily select an appropriate one from a plurality of program analysis/verification tools because it is possible to provide a uniform user interface. (4) Individual tool providers of program analysis/verification tools do not need to prepare a computational resource as well as users. Therefore, it is possible to flexibly use a surplus computational resource, which reduces a cost of analysis/verification and increases the kind of analysis/verification and a size thereof which can be executed. It is also possible to perform test of the program analysis/verification tools on various target programs. Particularly, it is possible to perform the test of the program analysis/verification tools on the target programs which have been difficult to be tested because of limitation of a computational resource.

Therefore, the present invention has an effect of easily executing analysis/verification of a program by selecting an appropriate one from a plurality of program analysis/verification tools. Further, the present invention can solve various practical problems of conventional program analysis/verification techniques by carrying out program analysis/verification on a sharing system.

Further, the program analysis/verification service provision system of the present invention further includes: tool designation information obtaining means for obtaining tool designation information to designate which program analysis/verification tool is used for the analysis/verification of the target program that the target program obtaining means has obtained, wherein: the tool storage section stores the plurality of program analysis/verification tools in a state in which the plurality of program analysis/verification tools are associated with respective pieces of tool related information on the plurality of program analysis/verification tools; and the tool extraction means searches for a piece of the tool related information on the basis of the tool designation information that the tool designation information obtaining means has obtained, and extracts the one or more program analysis/verification tools associated with the piece of the tool related information thus found.

According to the configuration, further, the tool storage section stores the plurality of program analysis/verification tools in a state in which the plurality of program analysis/verification tools are associated with respective pieces of tool related information on the plurality of program analysis/verification tools. Further, the tool designation information to designate which program analysis/verification tool is use for the analysis/verification of the target program is obtained, and a piece of the tool related information is searched for on the basis of the tool designation information, and then the one or more program analysis/verification tools associated with the piece of the tool related information thus found is extracted.

Therefore, it is possible to select a program analysis/verification tool in accordance with a target program by associating program analysis/verification tools with respective pieces of tool related information in advance and setting the target program together with the tool designation information. In the tool related information, it is possible to set, for example, the kind of programming language and the kind of program (distinction between a user program and a system program) with which the one or more program analysis/verification tools can deal, an execution environment in which the one or more program analysis/verification tools operate (the kind and version of operating system, the kind and version of library, a necessary computational resource (clock and the kind of CPU, sizes of memory and disk), etc.). Meanwhile, the tool designation information is information to designate which program analysis/verification tool is used for the analysis/verification, and can be selected from contents that have been set as the tool related information.

This makes it possible to provide a uniform user interface, so that users can easily select appropriate one or more program analysis/verification tools from the plurality of program analysis/verification tools.

Further, in the program analysis/verification service provision system of the present invention, the tool storage section stores, as the plurality of program analysis/verification tools, virtual machines in each of which a corresponding one of the plurality of program analysis/verification tools has been installed and set, and the tool execution means analyzes/verifies, on the virtual machine obtained by the tool obtaining means, the target program that the target program obtaining means has obtained.

According to the configuration, further, as the plurality of program analysis/verification tools, virtual machines in each of which a corresponding one of the plurality of program analysis/verification tools has been installed and set are prepared, and the target program can be analyzed/verified on this virtual machine.

Therefore, the present invention has the following effects. First, by executing analysis/verification with use of a virtual machine, it is easy to fairly use a system among a plurality of users and a plurality of providers of program analysis/verification tools. Second, by installing and setting program analysis/verification tools in a virtual machines, providers of program analysis/verification tools can install and set the program analysis/verification tools in an execution environment which is substantially similar to an execution environment in which the providers of program analysis/verification tools ordinarily develop and test the program analysis/verification tools. Therefore, in order to cause the program analysis/verification tools to adapt to a special execution environment, providers of the program analysis/verification tools do not need to perform additional works such as collection of the program analysis/verification tools and preparation of another system to cause the program analysis/verification tools to transmit/receive data to/from the outside. Note that analysis/verification of a target program on a virtual machine may be carried out while the target program is being executed on the virtual machine or is not being executed on the virtual machine.

Further, the program analysis/verification service provision system of the present invention further includes: virtual machine generation means for generating the virtual machines in each of which a corresponding one of the plurality of program analysis/verification tools has been installed and set, wherein the tool storage section stores, as the plurality of program analysis/verification tools, the virtual machines that the virtual machine generation means has generated.

According to the configuration, further, in a case of receiving another program analysis/verification tool, it is possible to generate a virtual machine in which the another program analysis/verification tool has been installed and set and to cause the tool storage section to store the virtual machine.

Therefore, generation of a virtual machine in which a program analysis/verification tool has been installed and set is carried out in the program analysis/verification service provision system, so that the tool providers do not need to generate the virtual machine. Further, a plurality of virtual machines in which respective different program analysis/verification tools have been installed and set can be made in a uniform way in consideration of an execution environment of the virtual machine particularly. Therefore, it is possible to deal with the plurality of virtual machines similarly.

Further, a program analysis/verification device according to the present invention, which configures the program analysis/verification service provision system, may include the target program obtaining means, the tool obtaining means, and the tool execution means.

Further, a program analysis/verification tool management device according to the present invention, which configures the program analysis/verification service provision system, may include: the program analysis/verification tool management device comprising the tool storage section and the tool extraction means.

Note that the program analysis/verification service provision system, the program analysis/verification device, and the program analysis/verification tool management device, may be realized by a computer. In this case, the present invention encompasses: a control program which achieves the program analysis/verification service provision system, the program analysis/verification device, and the program analysis/verification tool management device with use of a computer by causing the computer to operate as each of the foregoing means; and a computer-readable storage medium storing the control program therein.

(7 Supplementary Explanation)

Finally, blocks of the program analysis/verification service provision system 1, the analysis/verification section 100, the target program management section 200, and the tool management section 300, particularly, the analysis/verification control section 110, the target program management control section 210, and the tool management control section 310 can be configured by means of hardware logic or can alternatively be realized by software with use of a CPU (Central Processing Unit) as follows.

In the latter case, (each device configuring) the program analysis/verification service provision system 1 includes storage devices (storage media) such as a CPU (central processing unit) for executing a command of a program, ROM (read only memory) in which the program is stored, RAM (random access memory) for developing the program, and a memory in which the program and various data are stored. Further, the object of the present invention can be also realized in such a manner that: a recording medium is provided to (each device for configuring) the program analysis/verification service provision system 1, which recording medium has stored program codes (execution mode program, intermediate code program, and source program) of (each device for configuring) the program analysis/verification service provision system 1, serving as software for realizing the aforementioned functions, so that the program codes are readable by a computer; and the program codes stored in the recording medium are read out and carried out by the computer (or CPU or MPU).

Examples of the recording medium encompass: tapes such as a magnetic tape and a cassette tape; disks such as magnetic disks (e.g., a floppy (registered trademark) disk and a hard disk) and optical disks (e.g., a CD-ROM, an MO, an MD, a DVD, and a CD-R); cards such as an IC card (including a memory card) and an optical card; and semiconductor memories (e.g., a mask ROM, an EPROM, an EEPROM (registered trademark), and a flash ROM).

Further, (each device for configuring) the program analysis/verification service provision system 1 may be configured to be connect to a communication network, and the program code may be supplied via the communication network. The communication network is not particularly limited, and examples of the communication network encompass the Internet, an intranet, an extranet, a LAN, an ISDN, a VAN, a CATV communication network, a virtual private network, a telephone network, a mobile communication network, and a satellite communication network. In addition, a transmission medium constituting the communication network is not particularly limited, and examples of the transmission medium encompass: wired transmission media such as IEEE 1394, a USB, a power-line carrier, a cable TV line, a telephone line, and an ADSL; and wireless transmission media such as infrared rays (e.g., IrDA and a remote controller), Bluetooth (registered trademark), 802.11 wireless, an HDR, a cell-phone network, and a satellite line, and a digital terrestrial network. Note that the present invention may be also realized by a computer data signal which has the program codes specified with electronic transmission and is embedded in a carrier wave.

The present invention is not limited to the description of the embodiments above, and can be modified in numerous ways by a skilled person as long as such modification falls within the scope of the claims. An embodiment derived from a proper combination of technical means disclosed in different embodiments is also encompassed in the technical scope of the present invention.

INDUSTRIAL APPLICABILITY

The present invention can be used for a device (system) for analyzing/verifying a target program with use of a program analysis/verification tool.

REFERENCE SIGNS LIST 1 program analysis/verification service provision system (data processing service provision system)
100 analysis/verification section (program analysis/verification device)
111 user interface section (tool designation information obtaining means)
114 target program obtaining section (target program obtaining means)
115 tool obtaining section (tool obtaining means)
120 virtual machine execution environment section (tool execution means)
300 tool management section (program analysis/verification tool management device)
312 virtual machine generation section (virtual machine generation means)
313 tool registration/search section (tool extraction means)
320 tool storage section
P target program
T virtual machine

The invention claimed is:

1. A program analysis and/or verification service provision system for analyzing and/or verifying a target program with use of one or more program analysis and/or verification tool programs, the program analysis and/or verification service provision system comprising:

a storage device in which a plurality of program analysis and/or verification tool programs are stored; and at least one central processing unit (CPU) provided in at least one computer, the at least one CPU is configured to:

obtain the target program, extract, from the plurality of program analysis and/or verification tool programs stored in the storage device, the one or more program analysis and/or verification tool programs for use in analysis and/or verification of the target program that the at least one CPU has obtained, obtain, from the storage device, the one or more program analysis and/or verification tool programs that the at least one CPU has extracted, and analyze and/or verify, with use of each of the one or more program analysis and/or verification tool programs that the at least one CPU has obtained, the target program that the at least one CPU has obtained, the at least one CPU verifies the target program which is received from each of a plurality of users.

2. The program analysis and/or verification service provision system as set forth in claim 1, wherein:

the at least one CPU is configured to obtain tool designation information to designate which program analysis and/or verification tool programs is used for the analysis and/or verification of the target program that the at least one CPU has obtained, the storage device stores the plurality of program analysis and/or verification tool programs in a state in which the plurality of program analysis and/or verification tool programs are associated with respective pieces of tool related information on the plurality of program analysis and/or verification tool programs, and the at least one CPU searches for a piece of the tool program related information on the basis of the tool designation information that the at least one CPU has obtained, and extracts the one or more program analysis and/or verification tool programs associated with the piece of the tool program related information thus found.

3. The program analysis and/or verification service provision system as set forth in claim 2, the program analysis and/or verification service provision system being for subsequently carrying out a first process in which a pre-preprocessed program is preprocessed to obtain the target program and a second process in which the target program thus obtained through the first process is analyzed and/or verified with use of the one or more program analysis and/or verification tool programs, the program analysis and/or verification service provision system further comprising:

a post-preprocessed-program storage device for storing the target program, which has been obtained by preprocessing the pre-preprocessed program, so that the target program is associated with characteristics descriptive information on the target program, wherein:

the at least one CPU obtains the target program from the post-preprocessed-program storage device; and the at least one CPU obtains, as the tool designation information, from the post-preprocessed-program storage device, the characteristics descriptive information associated with the target program that the at least one CPU has obtained.

4. The program analysis and/or verification service provision system as set forth in claim 2, the program analysis and/or verification service provision system being for subsequently carrying out a first process in which the target program is analyzed and/or verified with use of the one or more program analysis and/or verification tool programs and a second process in which result data obtained through the first process is postprocessed, the program analysis and/or verification service provision system further comprising:

a result data storage device for storing the result data, which the at least one CPU has obtained by analyzing and/or verifying the target program with use of the one or more program analysis and/or verification tool programs, in a state in which the result data is associated with characteristics descriptive information on the result data, wherein:

the storage device stores at least one postprocessing tool program for postprocessing the result data in a state in which the at least one postprocessing tool program is associated with a piece of tool related information on the at least one postprocessing tool program;

the at least one CPU obtains, as the tool designation information, from the result data storage device, the characteristics descriptive information associated with the result data; and the at least one CPU searches for the piece of tool related information on the basis of the tool designation information that the at least one CPU has obtained, and extracts, from a plurality of postprocessing tool programs stored in the storage device, the at least one postprocessing tool program associated with the piece of tool related information thus found.

5. The program verification service provision system as set forth in claim 1, wherein the each of the plurality of users has:

(i) user identification information for identifying the each of the plurality of users and (ii) user permission information which defines access permission of the each of the plurality of users, and the at least one CPU obtains the target program, the user identification information, and the user permission information from the each of the plurality of users.

6. The program analysis and/or verification service provision system as set forth in claim 5, wherein:

the at least one CPU is configured to obtain tool designation information to designate which program analysis and/or verification tool programs is used for the analysis and/or verification of the target program that the at least one CPU has obtained, the storage device stores the plurality of program analysis and/or verification tool programs in a state in which the plurality of program analysis and/or verification tool programs are associated with respective pieces of tool related information on the plurality of program analysis and/or verification tool programs, and the at least one CPU searches for a piece of the tool program related information on the basis of the tool designation information that the at least one CPU has obtained, and extracts the one or more program analysis and/or verification tool programs associated with the piece of the tool program related information thus found.

7. The program verification service provision system as set forth in claim 6, wherein:

a plurality of tool providers who provide the program verification service provision system with the plurality of program verification tool programs have respective pieces of tool provider identification information for identifying the plurality of tool providers, and the storage device stores the plurality of program verification tool programs in a state in which the plurality of program verification tool programs are associated with:

(i) the respective pieces of tool related information on the plurality of program verification tool programs, and (ii) the respective pieces of tool provider identification information of the plurality of tool providers.

8. The program analysis and/or verification service provision system as set forth in claim 6, the program analysis and/or verification service provision system being for subsequently carrying out a first process in which a pre-preprocessed program is preprocessed to obtain the target program and a second process in which the target program thus obtained through the first process is analyzed and/or verified with use of the one or more program analysis and/or verification tool programs, the program analysis and/or verification service provision system further comprising a post-preprocessed-program storage device for storing the target program, which has been obtained by preprocessing the pre-preprocessed program, so that the target program is associated with characteristics descriptive information on the target program, wherein:

the at least one CPU obtains the target program from the post-preprocessed-program storage device, and the at least one CPU obtains, as the tool designation information, from the post-preprocessed-program storage device, the characteristics descriptive information associated with the target program that the at least one CPU has obtained.

9. The program analysis and/or verification service provision system as set forth in claim 6, the program analysis and/or verification service provision system being for subsequently carrying out a first process in which the target program is analyzed and/or verified with use of the one or more program analysis and/or verification tool programs and a second process in which result data obtained through the first process is postprocessed, the program analysis and/or verification service provision system further comprising:

a result data storage device for storing the result data, which the at least one CPU has obtained by analyzing and/or verifying the target program with use of the one or more program analysis and/or verification tool programs, in a state in which the result data is associated with characteristics descriptive information on the result data, wherein:

the storage device stores at least one postprocessing tool program for postprocessing the result data in a state in which the at least one postprocessing tool program is associated with a piece of tool related information on the at least one postprocessing tool program;

the at least one CPU obtains, as the tool designation information, from the result data storage device, the characteristics descriptive information associated with the result data; and the at least one CPU searches for the piece of tool related information on the basis of the tool designation information that the at least one CPU has obtained, and extracts, from a plurality of postprocessing tool programs stored in the storage device, the at least one postprocessing tool program associated with the piece of tool related information thus found.

10. The program analysis and/or verification service provision system as set forth in claim 1, wherein:

the storage device stores, as the plurality of program analysis and/or verification tool programs, virtual machines in each of which a corresponding one of the plurality of program analysis and/or verification tool programs has been installed and set, and the at least one CPU analyzes and/or verifies, on the virtual machine obtained by the at least one CPU, the target program that the at least one CPU has obtained.

11. The program analysis and/or verification service provision system as set forth in claim 10, wherein:

the at least one CPU is configured to generate the virtual machines in each of which a corresponding one of the plurality of program analysis and/or verification tool programs has been installed and set, and the storage device stores, as the plurality of program analysis and/or verification tool programs, the virtual machines that the at least one CPU has generated.

12. A program analysis and/or verification device, the program analysis and/or verification device configuring the program analysis and/or verification service provision system according to claim 1, the program analysis and/or verification device comprising the at least one CPU.

13. A program analysis and/or verification tool management device, the program analysis and/or verification tool management device configuring the program analysis and/or verification service provision system according to claim 1, the program analysis and/or verification tool management device comprising the storage device and the at least one CPU.

14. A method of controlling a program analysis and/or verification service provision system for analyzing and/or verifying a target program with use of one or more program analysis and/or verification tool programs, the program analysis and/or verification service provision system comprising a storage device in which a plurality of program analysis and/or verification tool programs are stored, the method comprising:

a target program obtaining step for obtaining the target program, a tool extraction step for extracting, from the plurality of program analysis and/or verification tool programs stored in the storage device, the one or more program analysis and/or verification tool programs for use in analysis and/or verification of the target program that the target program obtaining step has obtained;

a tool obtaining step for obtaining the one or more program analysis and/or verification tool programs that has extracted from the storage device in the tool extraction step; and a tool execution step for analyzing and/or verifying, with use of the one or more program analysis and/or verification tool programs that has obtained in the tool obtaining step, the target program that has obtained in the target program obtaining step, the tool execution step verifies the target program that is received from each of a plurality of users.

15. The method as set forth in claim 14, wherein:

the each of the plurality of users has:

(i) user identification information for identifying the each of the plurality of users, and (ii) user permission information which defines access permission of the each of the plurality of users, and the target program obtaining step obtains the target program, the user identification information, and the user permission information from the each of the plurality of users.

16. The method as set forth in claim 14, wherein:

a plurality of tool providers who provide the program verification service provision system with the plurality of program verification tool programs have respective pieces of tool provider identification information for identifying the plurality of tool providers, and the storage device stores the plurality of program verification tool programs in a state in which the plurality of program verification tool programs are associated with the respective pieces of tool provider identification information of the plurality of tool providers.

17. A computer-readable non-transitory storage medium storing therein a control program for causing at least one central processing unit (CPU) to perform the steps of claim 14.

18. A data processing service provision system for processing target data at multiple stages by subsequently using a plurality of data process tool programs, the data processing service provision system comprising:
a storage device; and
at least one central processing unit (CPU) provided in at least one computer,
wherein the storage device in which the plurality of data process tool programs are stored in a state in which the plurality of data process tool programs are associated with respective pieces of tool related information on the plurality of data process tool programs;
the data processing service provision system further comprising:
a result data storage device in which result data that has been obtained by processing data with use of one or more data process tool programs for use in a previous stage is stored in a state in which the result data is associated with characteristics descriptive information on the result data; and
the at least one CPU configured to:
  obtain the result data from the storage device;
  obtain, as tool designation information to designate which data process tool program is used for processing the result data that the at least one CPU has obtained, the characteristics descriptive information associated with the result data from the storage device;
  search for the pieces of tool related information on the basis of the tool designation information that the at least one CPU has obtained;
  extract the one or more data process tool programs associated with a corresponding piece of the tool related information from the plurality of data process tool programs stored in the storage device;
  obtain, from the storage device, the one or more data process tool programs that the at least one CPU has extracted; and
  process, with use of the one or more data process tool programs that the at least one CPU has obtained, the result data that the at least one CPU has obtained,
the at least one CPU verifies the target program which is received from each of a plurality of users.

19. The data processing service provision system as set forth in claim 18, wherein:
the each of the plurality of users has (i) user identification information for identifying the each of the plurality of users and (ii) user permission information which defines access permission of the each of the plurality of users, and
the at least one CPU obtains the result data, the user identification information, and the user permission information from the each of the plurality of users.

20. The data processing service provision system as set forth in claim 18, wherein:
a plurality of tool providers who provide the data processing service provision system with the plurality of data process tool programs have respective pieces of tool provider identification information for identifying the plurality of tool providers, and
the storage device stores the plurality of data process tool programs in a state in which the plurality of data process tool programs are associated with
  (i) the respective pieces of tool related information on the plurality of data process tool programs, and
  (ii) the respective pieces of tool provider identification information of the plurality of tool providers.

* * * * *